(12) United States Patent
Yoshimura et al.

(10) Patent No.: US 7,061,936 B2
(45) Date of Patent: Jun. 13, 2006

(54) METHOD AND APPARATUS FOR PACKET TRANSMISSION WITH HEADER COMPRESSION

(75) Inventors: Takeshi Yoshimura, Yokohama (JP); Toshiro Kawahara, Yokosuka (JP); Takashi Suzuki, Yokosuka (JP)

(73) Assignee: NTT Docomo, Inc., Tokyo (JP)

( * ) Notice: Subject to any disclaimer, the term of this patent is extended or adjusted under 35 U.S.C. 154(b) by 743 days.

(21) Appl. No.: 09/794,481

(22) Filed: Feb. 26, 2001

(65) Prior Publication Data

US 2001/0048680 A1 Dec. 6, 2001

(30) Foreign Application Priority Data

Mar. 3, 2000 (JP) .............................. 2000-059367

(51) Int. Cl.
*H04J 3/24* (2006.01)

(52) U.S. Cl. ...................... 370/474; 370/521; 370/349; 709/247

(58) Field of Classification Search ................ 370/389, 370/392, 521, 477, 349; 709/247
See application file for complete search history.

(56) References Cited

U.S. PATENT DOCUMENTS 6,032,197 A * 2/2000 Birdwell et al. ............ 709/247

(Continued)

FOREIGN PATENT DOCUMENTS

| JP | P2002-537716 A | 8/2000 |
| JP | P2003-519956 A | 7/2001 |
| WO | WO 00/49748 | 8/2000 |
| WO | WO 01/50705 A2 | 7/2001 |

OTHER PUBLICATIONS

Jonsson L.E. et al, "RObust Checksum-based header COmpression (ROCCO)," Internet Article, Jan. 18, 2000.
Degermark M et al., "RFC 2507: IP Header Compression." Internet Article, Feb. 1999.
Casner S. et al., "RFC 2508: Compressing IP/UDP/RTP Headers for Low-Speed Serial Links," Internet Article, Feb. 28, 1999.
Talluri R, "Error-Resilient Video Coding in the ISO MPEG-4 Standard," IEEE Communications Magazine, IEEE Service Center, Piscataway, N.J., US. vol. 36, No. 6, Jun. 1998.
Schulzrinne H. et al., "RFC 1889: A Transport Protocol for Real-Time Applications," Network Working Group Request for Comments, Jan. 1996.

(Continued)

*Primary Examiner*—Seema S. Rao
*Assistant Examiner*—Michael J. Moore
(74) *Attorney, Agent, or Firm*—Brinks Hofer Gilson & Lione

(57) ABSTRACT

Under the situation in a network including a transmitter and a receiver in which a transmitter converts a non-compressed packet to be transmitted as a full-header packet including a full header or a header-compressed packet including a compressed header, and sends the converted packet to the receiver, the transmitter sends at least an important packet in the non-compressed packet to be transmitted as a full-header packet. The important packet means for example, a packet containing the data serving an important role when the data terminal eventually receiving each packet reproduces the audio and/or image in accordance with the data in each packet.

25 Claims, 17 Drawing Sheets

U.S. PATENT DOCUMENTS

| | | | |
|---|---|---|---|
| 6,385,199 B1 * | 5/2002 | Yoshimura et al. | 370/393 |
| 6,608,841 B1 * | 8/2003 | Koodli | 370/474 |
| 6,680,955 B1 * | 1/2004 | Le | 370/477 |
| 6,751,209 B1 * | 6/2004 | Hamiti et al. | 370/349 |
| 6,754,231 B1 * | 6/2004 | Jonsson et al. | 370/474 |
| 6,882,637 B1 * | 4/2005 | Le et al. | 370/349 |

OTHER PUBLICATIONS

Y. Ito, M. Ishikawa, T. Asami, "A Study of the Relationship Between Network QoS and an Application," Proceedings of the 57th Meeting of the Information Processing Society of Japan, vol. 3, pp. 323-324, Oct. 5, 1998.

* cited by examiner

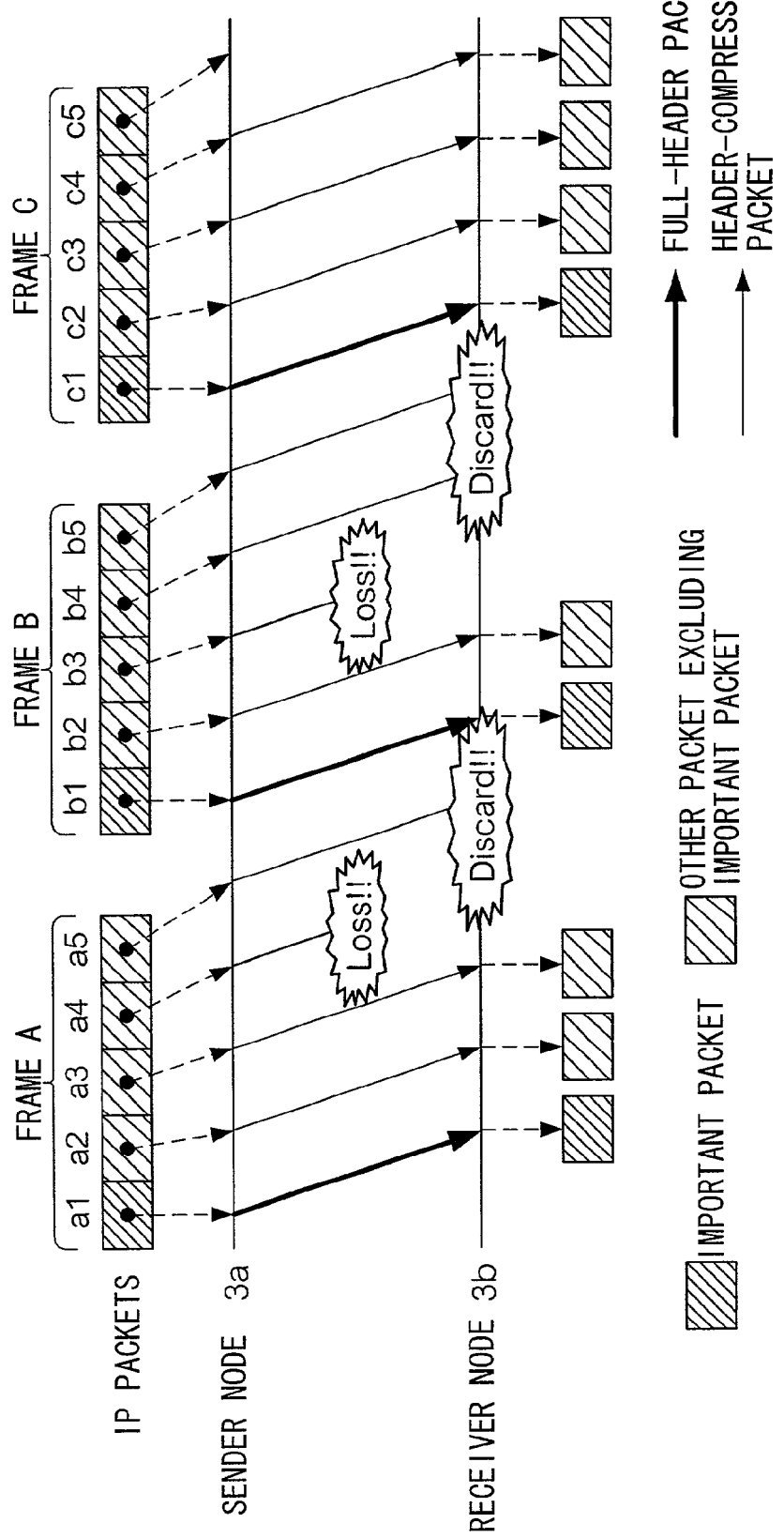

FIG. 9A
- PRIOR ART -

| 0 | 1 | 2 | 3 | 4 | 5 | 6 | 7 |
|---|---|---|---|---|---|---|---|
| 0 | SN | | | | CRC | | |

FIG. 9B
- PRIOR ART -

| 0 | 1 | 2 | 3 | 4 | 5 | 6 | 7 |
|---|---|---|---|---|---|---|---|
| 1 | 0 | TS | | | | | |
| M | SN | | | | CRC | | |

FIG. 9C
- PRIOR ART -

| 0 | 1 | 2 | 3 | 4 | 5 | 6 | 7 |
|---|---|---|---|---|---|---|---|
| 1 | 1 | 0 | TS | | | | |
| TS | M | SN | | | | | |
| X | CRC | | | | | | |
| EXTENSION HEADER (WHEN X-1) | | | | | | | |

RTP/UDP/IP HEADERS

COMPRESSED HEADERS

METHOD AND APPARATUS FOR PACKET TRANSMISSION WITH HEADER COMPRESSION

BACKGROUND OF THE INVENTION

1. Field of the Invention

The present invention relates to a packet transmitting method for transmitting and receiving packets among a plurality of data terminals, and a relaying device and a data terminal used for the packet transmission.

2. Description of Related Art

Recently, a demand for transmitting through the Internet such data as video data or audio data, which requires a real time transmission, has been intensified.

As a protocol to meet the demand, an RTP (Real time Transport Protocol) is ruled by the RFC (Request For Comment) 1889, which was issued by the IETF (Internet Engineering Task Force), a group for standardizing the Internet. The RTP has functions such as 1) specification of a payload type, 2) designation of a sequence number, and 3) designation of a timestamp. These rules enable such information as audio and video data to be transmitted in real time on the Internet. Usually, the RTP is used as an upper layer for the IP (internet protocol) on a network layer and the UDP (User Datagram Protocol) on a transport layer.

FIG. 13A shows contents of an RTP header, UDP header, and IP header (hereafter, referred to as "RTP/UDP/IP headers") attached to data, such as audio and video data, to be transmitted according to the RTP, UDP and IP. Hereinafter, a packet including the RTP/UDP/IP headers is called an IP packet.

As shown in the drawing, the IP header needs 20 bytes, the UDP header needs 8 bytes, and the RTP header needs 12 bytes, thus the total amount of RTP/UDP/IP headers reaches 40 bytes. In contrast, video data contained in one IP packet comprises, for example, about 50 bytes. For transmitting such image data in the form of packets, the overhead reaches therefore no less than 44 percent. Similarly, for transmitting audio data which comprises 20 bytes in one packet, the overhead reaches as much as 66 percent. Since a practical transmission needs headers for other layers to be added, the whole headers occupy a large percentage of one packet, thereby causing a drawback of reducing efficiency in communication.

As one technique to overcome the drawback, the RFC2508 issued by the IETF shows an RTP compression protocol to compress the RTP/UDP/IP headers. The RTP compression protocol permits the RTP/UDP/IP headers shown in the FIG. 13A to be compressed into a header exemplified in FIG. 13B (hereinafter referred to as a "compressed header"). This compression will be detailed as follows.

The method of the compression is applied between two nodes on a network through which packets are transmitted among a plurality of data terminals, for example. More specifically, of the two nodes, one node (hereinafter referred to as a "sender node") converts the RTP/UDP/IP headers of one part of the IP packets communicated among the data terminals into a compressed header, and transmits it, as a header-compressed packet, to the other node (hereinafter referred to as a "receiver node"). Concurrently, the sender node transmits the RTP/UDP/IP headers of the other part of the IP packets to the receiver node, as a full-header packet without any compression. The receiver node decompresses (i.e., restoration) to an IP packet the header-compressed packet or the full-header packet received from the sender node, and sends it to the next node or a receiver data terminal. The full header is a header in which lengths included in the RTP/UDP/IP headers shown in FIG. 13A are replaced by information including a CONTEXT_ID for identifying the RTP connection and a link sequence number link_seq, a serial number, given in the order of transmission from the sender node.

The content of the compressed header shown in FIG. 13B will now be explained. The data of sections with dense hatching applied in the RTP/UDP/IP headers in FIG. 13A, which includes a version number (V) written in the IP header and the payload type written in the RTP header, are constant data (hereinafter referred to as "static fields") for each packet to be transmitted from the sender node. Hence, as illustrated in FIG. 13B, the compressed header does not include data of the static fields. When the sender node sends the first IP packet of the packet stream to the receiver node, it sends a full-header packet which has a full header including the static fields. After this, the sender node converts the RTP/UDP/IP headers of the succeeding IP packets into a compressed header with no static fields included. The thus-converted compressed header is sent to the receiver node as a header-compressed packet. When the receiver node receives the full header packet corresponding to the first IP packet, the receiver node restores the received RTP/UDP/IP headers with reference to the full header in the first received full-header packet, and writes the thus decompressed headers into an internal storage device. After this, the receiver node uses the static fields of the RTP/UDP/IP headers so as to restore the static fields of the compressed header in the header-compressed packets that will be received successively after the first packet.

The data in the static fields are not always constant over all the IP packets, but might be changed depending on a certain IP packet. If such a change occurs in a certain IP packet, the sender node will transmit a full header packet including a full header corresponding to the RTP/UDP/IP header of the IP packet to the receiver node, without compression.

The data in the sections with no hatching applied in the RTP/UDP/IP headers shown in FIG. 13A include the sequence number and timestamp of the RTP header as well as the ID of the IP header. The timestamp indicates the time at which a packet is transmitted or generated. Such data are expected to have constant difference values (changed amounts) between successive two IP packets transmitted in turn. Hereinafter, fields providing such data are referred to as "delta fields." As shown in FIG. 13B, the basic compressed header does not include the data in the delta fields. As described above, the receiver node, which holds RTP/UDP/IP headers in its storage device, adds difference values, which have been previously obtained, respectively to the values in the corresponding delta fields of the stored RTP/UDP/IP headers, thus being able to decompress delta fields of compressed headers which will consecutively be received thereafter.

However, it is not always true that the difference values in the delta fields are constant between all the IP packets. There are some cases where changes are made to their difference values. In such cases, changed difference values have to be notified to the receiver node. The receiver node is able to restore the contents in the delta fields contained in the RTP/UDP/IP headers of each header-compressed packet which will be received thereafter, with reference to the contents of the RTP/UDP/IP headers held in the storage device and the newly notified difference values. For this purpose, the compressed header shown in FIG. 13A has flags S, T and I that represent whether the difference values in the delta fields are changed or not. If any difference values are changed, the new difference values are added to the compressed header, as shown by the dotted lines in FIG. 13B. Practically, if there is a change in the difference value of the sequence number of the RTP header, "1" is set to the flag S and a sequence number difference value (delta RTP sequence) showing the new difference value of the sequence number is added to the compressed header, as shown by the dotted line in FIG. 13B. Similarly, if there is a change in the difference value of the timestamp of the RTP header, "1" is set to the flag T, and a timestamp difference value (delta RTP timestamp) showing the new difference value of the timestamp is included in the compressed header, as shown by the dotted line in FIG. 13B. Further, if there is a change in the difference value of the ID of the IP header, "1" is set to the flag I, and an ID difference value (delta IP ID) showing the new difference value of the ID is attached to the compressed header.

As shown in FIG. 13B, the compressed header further includes the CONTEXT_ID and link_seq, like the full header. The receiver node decompresses the compressed header in compliance with the contents of RTP/UDP/IP headers specified by the CONTEXT_ID. The receiver node refers to the link sequence number link_seq of each packet (header-compressed packet or full-header packet) sent in order from the sender node. When it is found that some link sequence numbers are dropped, the receiver node determines that the packets are lost between the transmitter and receiver nodes.

Referring to FIG. 14, procedures made for packet transmission between the transmitter and receiver nodes will now be described. In FIG. 14, a field A shows a static field of the RTP/UDP/IP headers (i.e., any of the data with the dense hatching applied in FIG. 13A), and a field B shows a delta field (i.e., any of the data with no hatching applied in FIG. 13A). Further, in FIG. 14, "F" represents a full-header packet, while "C" represents a header-compressed packet.

When receiving an IP packet a transmitted from a transmitter data terminal to a receiver data terminal, the sender node stores the RTP/UDP/IP headers of the IP packet a into its internal storage device. Concurrently, the sender node produces a full header by substituting lengths in the headers for a CONTEXT_ID and link sequence number link_seq, and transmits to the receiver node the full header packet including both the produced full header and data (hereinafter referred to as an "RTP payload"), which is the part of the IP packet excluding the RTP/UDP/IP headers (refer to "OP1" in FIG. 14). The receiver node which received this full-header packet restores the RTP/UDP/IP headers from the full header of this packet (namely, the CONTEXT_ID and link_seq are extracted from the full header), and transmits the IP packet with this header to the next node or a receiver data terminal. In this operation, the decompressed RTP/UDP/IP headers are stored into its internal storage device.

The sender node then converts the RTP/UDP/IP headers in an IP packet b received after the IP packet a into a compressed header, and transmits the packet b with the compressed header to the receiver node (refer to "OP2" in FIG. 14). In the compressed header in the header-compressed packet, a difference value ΔB(=1) between a value [1] in the delta fields B of the packet b and a value [0] in the delta fields B of the last packet a is added, while a value of "1" is set to the flags (flags S, T and I shown in FIG. 13B) that represent changes or non-changes in the difference value.

The receiver node, which received the header-compressed packet b, obtains the delta fields B of the compressed headers of the header-compressed packet b by adding the difference value ΔB notified in this packet to the values of the delta fields B of the RTP/UDP/IP headers of the last IP packet a stored in the internal storage. The receiver node then transmits an IP packet b having both of the RTP/UDP/IP headers, which include the delta fields B and the static fields A of the RTP/UDP/IP headers of the IP packet a, and the RTP payload. The RTP/UDP/IP headers referred in decompressing the IP packet b (in this case, the RTP/UDP/IP headers extracted from the last IP packet a) is specified by the CONTEXT_ID of the header-compressed packet b. The RTP/UDP/IP headers of the IP packet b and the difference value ΔB notified in this packet are also stored in the internal storage.

When next receiving an IP packet c, the sender node calculates a difference value between values of delta fields B of both of the IP packet c and the last IP packet b. The difference value ΔB is [1] (=3−2) in this case, which is the same as the previous one notified to the receiver node last time. Therefore, there is no need to newly notify the receiver node of the unchanged difference value. Hence, the sender node transmits to the receiver node a header-compressed packet c having a compressed header with no difference value (i.e., information shown by the dotted line in FIG. 13B (refer to "OP3" in FIG. 14). The receiver node that received this header-compressed packet c adds the stored difference value ΔB to the delta fields B of the previous packet b, thereby decompressing the delta fields B of this compressed header of the header-compressed packet. Then the receiver node sends an IP packet c composed of both RTP/UDP/IP headers, including the decompressed value and the static fields A extracted from the full header of the full-header packet a, and RTP payload. The next packet d is processed similarly.

The delta fields B of an IP packet e next received by the sender node is [5] in value, of which difference value from the delta fields B of the last IP packet d is [2]. When the difference value ΔB is changed in this way, the sender node transmits a header-compressed packet e having a compressed header in which the changed new difference value is added and the corresponding flag is set to [1]. The receiver node adds the newly notified difference value to the values of the delta fields B of the IP packet d so as to decompress the delta fields B of the packet e, then transmits an IP packet containing the decompressed delta fields B.

The sender node then receives an IP packet g, which is different in the static field A from the last IP packet e. Thus, in this case, the sender node does not compress the RTP/UDP/IP headers of this IP packet and transmits a full-header packet g having a full header in which the lengths in the RTP/UDP/IP headers of the packet g is replaced by the CONTEXT_ID and link_seq. The receiver node that received this full-header packet g converts the full header into the RTP/UDP/IP headers and memorizes them in the internal storage.

The header compression method ruled by the RFC2508 has been described above (hereinafter referred to as a "method A"). However, this compression method has been suffering from some drawbacks, which will be described as follows.

For instance, as shown in FIG. 15, an assumption is made that the header-compressed packet c is lost between the transmitter and receiver nodes for some reason. As described above, when decompressing the packet d, the receiver node adds the difference value ΔB to the delta fields B of the IP packet c to decompress the delta fields B of the IP packet d. As a result, when the header-compressed packet c is lost, it is impossible to decompress the delta fields B of the header-compressed packet d. The receiver node is therefore forced to discard packets d, e and f shown in FIG. 15, which are received until the next full-header packet g. In other words, the loss of the packets causes consecutive losses of some other packets, which leads to reducing a throughput compared to a method in which the header compression is not involved. In particular, in cases the transmitter and receiver nodes are connected by a wireless link, a packet is likely to be lost in the wireless link. If such a loss occurs, some other packets are frequently discarded at the receiver node. As a technique to resolve such a problem, the RFC 2507 and 2508 issued by the IETF and the Internet-Draft provide the following methods.

Method 1: Repetitive Transmission of Full-header Packet (RFC 2507)

In the case of the foregoing conventional method A, the sender node transmits a full-header packet only when the static fields of a header change in value. In contrast, as shown in FIG. 16, this method 1 selects several IP packets to be transmitted every predetermined number of packets, regardless of whether the static fields changes in value or not. And the selected IP packets are converted to the full header packets with full headers and the full header packets are transmitted to the receiver node, while the remaining IP packets are converted to header-compressed packet with compressed headers and the header-compressed packets are transmitted to the receiver node. In the method A, since full-header packets are not transmitted to the receiver node as long as their static fields do not change in value, all the packets transmitted after the occurrence of loss of a packet are discarded. In contrast, the present method 1 allows a full-header packet to be transmitted at intervals, so that it has the advantage that the number of packets discarded owing to the loss of the packets can be lowered. However, the present method 1 has trade-offs that a longer period for transmitting full-header packets results in that the number of packets discarded is raised, whilst a shorter period for transmitting full-header packets results in that a large number of full-header packets with large overheads are transmitted, reducing efficiency in communication.

Method 2: Request for Full Headers Through Back Channel (RFC2507 and 2508)

As shown in FIG. 17, when detecting the loss of a packet, the present method 2 permits the receiver node to transmit a CONTEXT_STATE, a message to request a full-header packet for the sender node. When receiving the CONTEXT_STATE, the sender node transmits the next IP packet to the receiver node in the form of a full-header packet. As a result, an interval during which some packets are discarded due to the loss of a certain packet can be limited to the interval starting between the occurrence and the packet loss to the reception of a full-header packet transmitted in response to the CONTEXT_STATE. Nevertheless, the present method has a drawback that as the interval between the transmission of the CONTEXT_STATE and the reception of a full-header packet at the receiver node, that is, an RTT (Round Trip Time), becomes larger, the number of packets discarded are also raised. For communicating packets by way of a wireless link, such a drawback becomes noticeable, because the RTT of the wireless link is very long.

Method 3: Twice Algorithm (RFC 2507)

According to the present method 3, the compressed headers of header-compressed packets received after the loss of a certain packet are decompressed using the RTP/UDP/IP headers decompressed most lately before the occurrence of loss of the packet. For example, as shown in FIG. 18, it is assumed that after a packet b is received in order, a packet c is lost, and then a packet d is received in order. In this situation, when a difference value ΔB is unchanged in value over the packets b to d, the delta fields B of the packet d can be calculated by adding a value of double ΔB to the delta fields B of the packet b. Moreover, the present method needs the UDP checksum included in a compressed header (refer to FIG. 13B), so that the UDP checksum is used to determine if packets were decompressed correctly. However, as shown in FIG. 18, in cases where a packet k is lost and difference values ΔB of the delta fields between packets and k change, there is the problem that a packet 1 received immediately after the packet loss cannot be decompressed correctly. In particular, in the case that packets are communicated via a wireless link, there is a possibility that packets are lost in sequence (namely, over a long interval). Under such a situation, it is considered that difference values ΔB are likely to change for a large number of lost packets. Therefore the foregoing problem is amplified.

Method 4, ROCCO (Internet-Draft)

According to the present method 4, the difference value ΔB can be estimated on a characteristic of a media through which packets are transmitted. For example, in the case of FIG. 19, it is assumed that packets g and b are lost and difference values ΔB between the packets g and h change. In this case, changes in the difference values ΔB are estimated on a characteristic of a media through which packets are transmitted, and a packet can be decompressed through addition of the estimated difference value ΔB to the packet f. Additionally, the present method uses an error detecting code (CRC) to confirm if the decompression is performed correctly or not. Thus, even if the difference value ΔB changes, the present method enables packets received after the loss of a certain packet to be decompressed. However, the present method involves a difficulty in how the difference value ΔB is estimated.

As described above, although a variety of techniques have been proposed to efficiently perform data communication even when RTP/UDP/IP headers of IP packets are compressed, any technique has some drawbacks. Thus, it is a present situation that there is a limitation in effectively reducing the number of packets to be discarded owing to the loss of a certain packet that has been caused between the transmitter and receiver nodes. That is to say, loss of a part of packets during the packet transmission between the transmitter and the receiver nodes causes loss of the other packets in the receiver node. This causes great damage on the data processing using the packets received by the receiver data terminal (for example, display of image or replay of music using the received packets).

SUMMARY OF THE INVENTION

The present invention has been made in view of the foregoing circumstances. An object of the present invention is to provide a packet transmitting method, a relaying device and a data terminal capable of effectively reducing the number of packets to be discarded due to the loss of a certain packet, even if headers of packets to be transmitted and received are compressed.

According to one aspect of the present invention, an object of the present invention is achieved by a packet transmitting method for transmitting packets from a sender node to a receiver node through a network, comprising the steps of conversion by a communication apparatus provided on the sender node, for converting non-compressed packets to be transmitted into either a refresh-header packet with a refresh header containing information enough to be decompressed correctly and recover synchronization at the receiver node or a header-compressed packet with a compressed header containing less information than the refresh header, so that some of the non-compressed packets are converted into the refresh header packets as long as the packets are important packets; and transmission of a packet stream containing the refresh-header packet and the header-compressed packet to the receiver node.

In the method, an important packet containing the data serving an important role in the packet stream is transmitted as the refresh-header packet which can always be decompressed correctly and recover the synchronization. Accordingly, since the important packet is not discarded due to the loss of other packets, the influence of the packet loss on the quality of the media, namely, the deterioration of the quality of the displayed image and the replayed audio can be lowered.

The refresh header can be a full header including the content of the original header of the non-compressed packet. The refresh header also may be another format. For example, in the situation in which the first packet transmitted to the receiver node has initialized the compression state, the sender node may transmit a refresh header which is able to refresh the compression state based on the result of the previous initialization.

The present invention can be embodied so as to produce or sell the relay apparatuses or the data terminals for transmitting packets in accordance with the packet transmitting method of the present invention. Furthermore, the present invention can be embodied so as to record the program executing the packet transmitting method of the present invention into storage media readable by computers, or provide the program to users through electronic communication circuits.

BRIEF DESCRIPTION OF THE DRAWINGS

FIG. 3 is a timing chart showing an operation of the packet relaying device according to the first embodiment of the present invention.

FIG. 9A shows a Type-0 header in ROHC;

FIG. 9B shows a Type-1 header in ROHC;

FIG. 9C shows a Type-2 header in ROHC.

DETAILED DESCRIPTION OF THE INVENTION

With reference to the accompanying drawings, embodiments of the present invention will now be described. The embodiments, which represent various modes of the present invention, do not mean to limit the scope of the present invention and can be modified within the scopes of the present invention.

A: First Embodiment

A-1: Configuration of the First Embodiment

Figure 1:
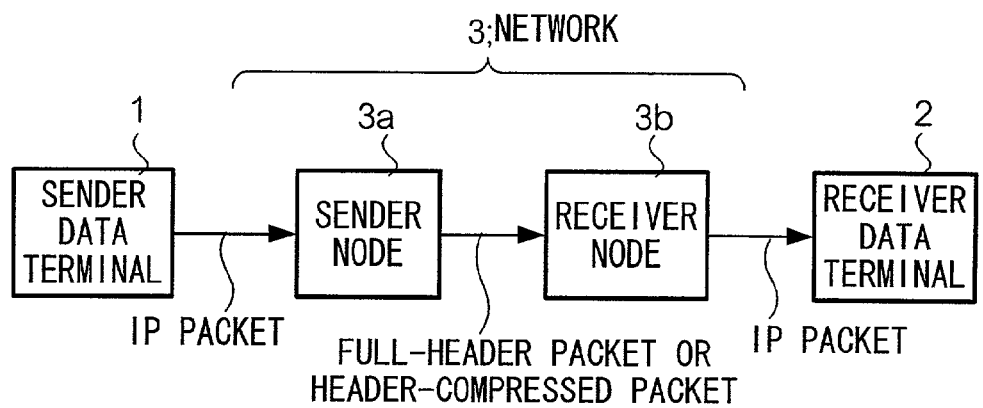
FIG. 1 is a block diagram exemplifying the configuration of a communication system to which the packet transmitting method according to the first embodiment of the present invention is applied.

FIG. 1 is a block diagram pictorially exemplifying a configuration of a communication system into which a packet transmitting method of the present invention can be applied. In the communication system, a transmitter data terminal 1 and a receiver data terminal 2 are provided so as to exchange packets through a network 3. The present invention is described hereinafter with reference to an example in which the transmitter terminal 1 sends packets to the receiver terminal 2.

The network 3 includes a sender node 3a and a receiver node 3b. Relay apparatuses are provided on the sender node 3a and receiver node 3b. The relay apparatuses have a function to relay packets which are to be exchanged between the transmitter and receiver data terminals 1 and 2. Although the network 3 of FIG. 1 exemplifies a configuration including the transmitter and receiver nodes 3a and 3b, the present invention is not confined to this configuration. Three or more nodes and relay apparatuses provided thereon can be included in the network.

Figure 13A:
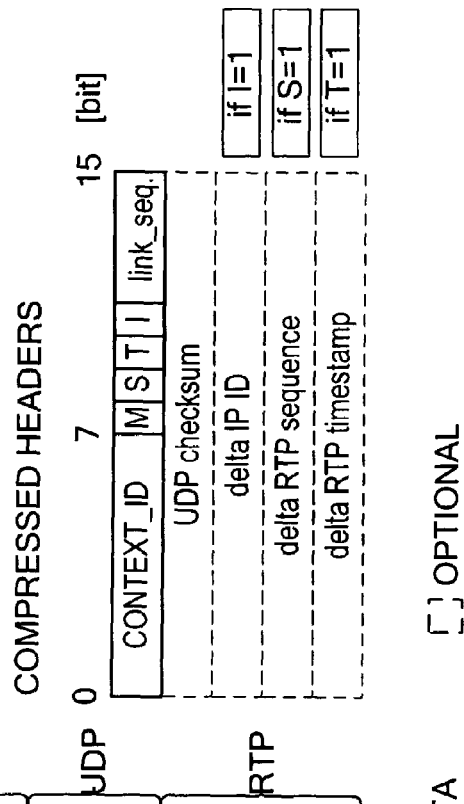
FIG. 13A shows a content of a RTP/UDP/IP header.

In this configuration, the transmitter data terminal 1 sends in sequence packets destined for the receiver data terminal 2 through the network 3. A packet to be sent from the transmitter data terminal 1 is an IP packet including RTP/UDP/IP headers shown in FIG. 13A. The relay apparatus on the sender node 3a receives in order IP packets sent from the transmitter data terminal 1, converts the received IP packets into either full-header packets including a full header or header-compressed packets including a compressed header, and sends them to the receiver node 3b. As described before, the full header is a header in which a length value contained in an IP header or UDP header of RTP/UDP/IP headers of an IP packet is replaced by data including a CONTEXT_ID or link_seq. On the other hand, when receiving the header-compressed packet or full-header packet transmitted from the sender node 3a, the relay apparatus on the receiver node 3b restores the RTP/UDP/IP headers from the compressed-header of the header-compressed packet or the full header of the full-header packet, and sends an IP packet including the RTP/UDP/IP headers to the receiver data terminal 2. The receiver data terminal 2 receives an IP packet sent from the receiver node 3b and performs predetermined processing (for example, display of images, replay of sound, or the like in accordance with an RTP payload) according to the received IP packet.

Like the conventional technique described before, the full header packet means a packet enabling to restore an IP packet including RTP/UDP/IP headers on the basis of only contents of the full header included in the full-header packet. The length values included in the RTP/UDP/IP headers are replaced by a CONTEXT_STATE and link_seq, however, the length values can be restored with reference to the information on lower layers as well. In contrast, the header-compressed packet means a packet that can be decompressed to an IP packet based on other packets (such as full-header packet), and cannot be decompressed to an IP packet including RTP/UDP/IP headers based only on the compressed header included in the header-compressed packet.

Figure 2:
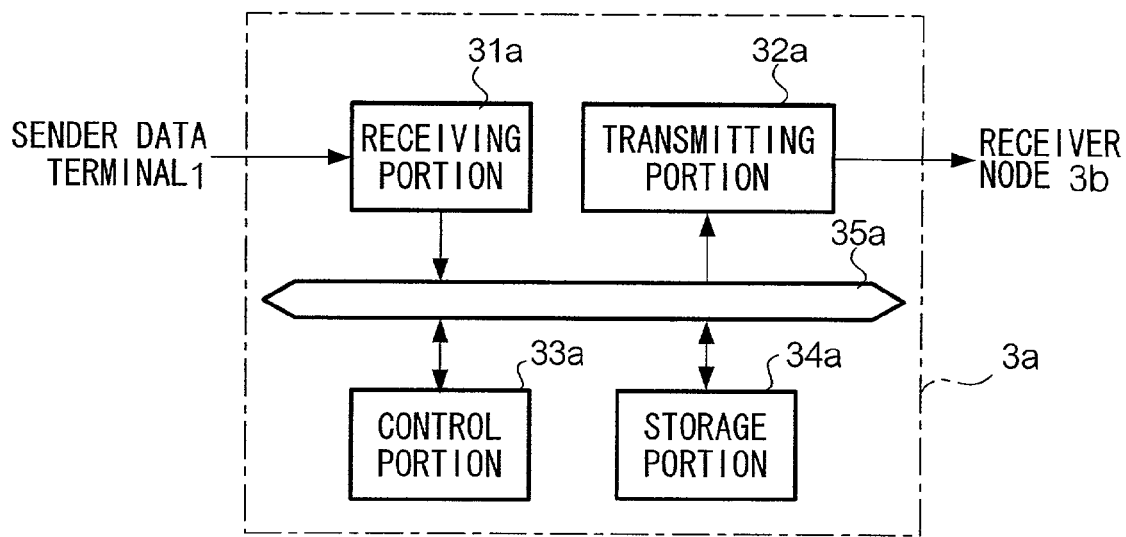
FIG. 2 is a block diagram exemplifying the configuration of a receiver node used in the packet transmitting method.

Referring to FIG. 2, the relay apparatus provided on the sender node 3a will now be described. As shown in the drawing, the relay apparatus on the sender node 3a includes a receiving portion 31a, transmitting portion 32a, control portion 33a, storage portion 34a, and bus 35a connecting those units with each other.

The receiving portion 31a serves as a means or unit for receiving IP packets sent from the transmitter data terminal 1 through a communication line and outputting the packets to the control portion 33a. The transmitting portion 32a serves as a means or unit for transmitting the data output from the control portion 33a through a communication line to the receiver node 3b.

A control portion 33a is a means or unit for controlling each of the receiving portion 31a, the transmitting portion 32a and the storage portion 34a. Practically, the control portion 33a implements the following processes described in item a and b.

a. Decision of Importance of Received IP Packets

The relay apparatus provided on the sender node in the related art described above was configured so that the relay apparatus converted the packet with the static field in the header changed, the packet selected every specific fixed numbers, or the packet to be transmitted immediately after receiving CONTEXT_STATE from the receiver node, into a full-header packet without compressing the header of the packet and transmitted the full-header packet to the receiver node. On the contrary, the relay apparatus provided on the sender node 3a of the present embodiment is configured so that the relay apparatus receives IP packets sent from the transmitter data terminal 1, and converts the IP packets whose data is important (hereinafter referred to as an "important packet") into a full-header packet without compressing the header, and transmits the full-header packet to the receiver node 3b. Here, the important packet means the packet including the data which serves important role when the receiver data terminal 2 replays the audio or displays images. More specifically, the important packet means the packet including the data remarkably affecting the quality of the audio or image (for example, deteriorating the quality of the image displayed or music replayed) at the receiver data terminal 2 when the packet is lost. The control portion 33a at the sender node 3a decides that the received IP packet is important in the following cases described hereunder.

① IP Packet with the Marker Bit M in the RTP Header Set or the Next Packet to the IP Packet with a Marker Bit M Set The marker bit M is contained in the RTP header in the IP packet transmitted from the transmitter date terminal 1. The control portion 33a in the sender node 3a decides importance of the IP packet by examining the marker bit. The detail thereof is described hereunder.

In the case where the data transmitted from the transmitter data terminal 1 is video data including several frames, the first data of each frame usually contains very useful information for displaying the images. On the other hand, the marker bit M in the RTP header is generally set in the packet containing the last data of a video frame. The next packet of the packet with the marker bit M in the RTP header set is usually the first data of a video frame. Accordingly, the control portion 33a in the sender node 3a is configured so that the next packet of the packet with the marker bit M in the RTP header set is decided to be the important packet.

In addition, there are cases in which the marker bit M in the RTP header may be set when the payload contains some configuration information, e.g., the data structure or the like. On the other hand, the packet containing the configuration information serves important role when in the receiver data terminal uses the data to display the images or replay music. Accordingly, the control portion 33a in the sender node 3a may be configured so that a packet with the marker bit M in the RTP header set is decided to be an important packet.

② Cases Where the Timestamp in the RTP Header is Changed

In the case where the data in the IP packet transmitted from the transmitter data terminal 1 is video data including several video frames, the value of the timestamp of each packet is identical among the packets containing the same video frame. On the other hand, the values of the timestamp are in general different if the two packets contain the data belonging to different video frames. Accordingly, it may be decided that the frames are changed when the timestamp changes. As described above, the data immediately after the frame is changed has important information to display the images at the receiver data terminal 2. The control portion 33a at the sender node 3a therefore decides that the packet received is the important packet (i.e., the packet containing the initial information of each frame), when the value of the timestamp in the received IP packet is different from the value of the timestamp in the previous packet.

③ Cases Where the Size of the Packet is Larger than a Specific Value

When the payloads of IP packets transmitted from the transmitter data terminal 1 are audio data including talkspurts and silence portions, the size of the packets including the data talkspurts is in general larger than the size of the packet containing the of silence portions. When the packet containing the data of talkspurts is not correctly received in the receiver data terminal 2, the quality of the audio is remarkably deteriorated compared with the case when the packet containing the data of silence portions is not correctly received. Accordingly, when the data in the IP packet transmitted from the transmitter data terminal 1 is audio data, the control portion 33a at the sender node 3a examines whether the payload of each packet is the data of talkspurts or the data of silence portions in accordance with the size of the IP packet, and decides that the packet containing the data of talkspurts, namely the packet having the size larger than the prescribed size, is the important packet.

④ Cases where the Packet Size is Changed

When the payloads of IP packets transmitted from the transmitter data terminal 1 are audio data including talkspurts and silence, the receiver data terminal 2 needs to recognize the switch from talkspurts to silence, and the switch from silence to talkspurts. The control portion 33a at the sender node 3a therefore converts the packet immediately after the switch from silence to talkspurts or the switch from talkspurts to silence into a full-header packet without compressing the header and transmits the full-header packet to the receiver node 3b. Practically, the control portion 33a at the sender node 3a examines whether the size of the IP packet is larger than the prescribed size (constant value) or not whenever receiving the IP packet, and decides that the IP packet received this time is the important packet in the case when the packet received previous time has a smaller size than the prescribed size, and simultaneously the packet received this time has a larger size than the prescribed size. Similarly, the packet received this time is decided to be the important packet in the case when the packet received previous time has a larger size than the prescribed size, and simultaneously the packet received this time has a smaller size than the prescribed size.

⑤ Cases where Configuration Information Specific to the Media to be Transmitted is Contained The control portion 33a at the sender node 3a examines whether or not the received IP packet contains a picture header of H.263 or the information corresponding to a VOP header of MPEG4 or the like, and decides that the packet containing the above information is the important packet.

b. Generating and Transmitting a Header-compressed Packet and a Full-header Packet The control portion 33a at the sender node 3a outputs the first packet and the IP packet decided to be the important packet within the IP packets received from the transmitter data terminal 1 as a full-header packet to the transmitting portion 32a, while outputting the remaining packets as a header-compressed packet to the transmitting portion 32a.

More specifically, for the IP packet to be transmitted as a full-header packet, the control portion 33a adds a context ID and a link sequence number (link seq) to the inner RTP/UDP/IP header to form a full-header and sends a full-header packet containing the full-header to the receiver node 3b. On this occasion, the content of the IP packet is stored in the storage portion 34a.

Figure 13B:
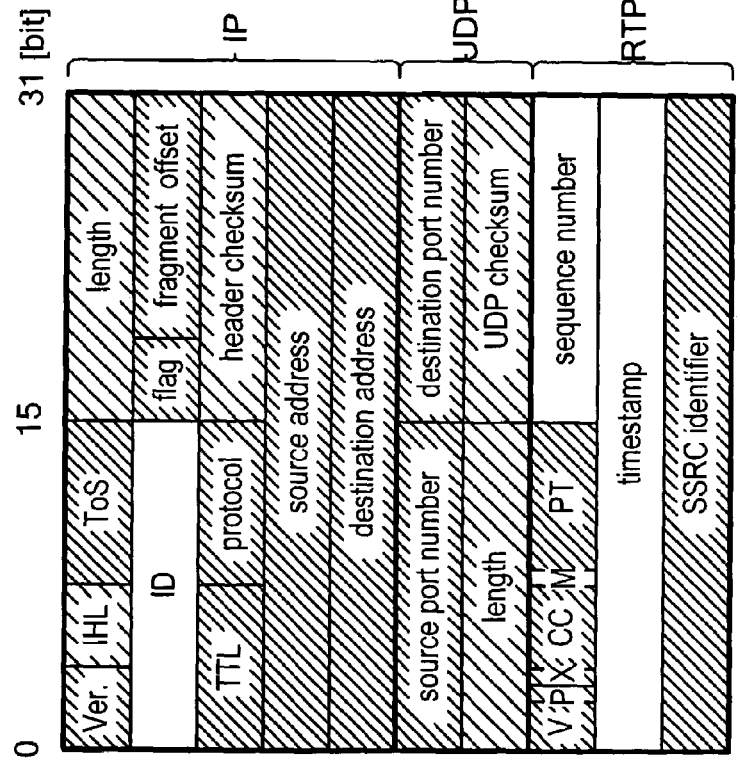
FIG. 13B shows a content of the compressed header.
Figure 14:
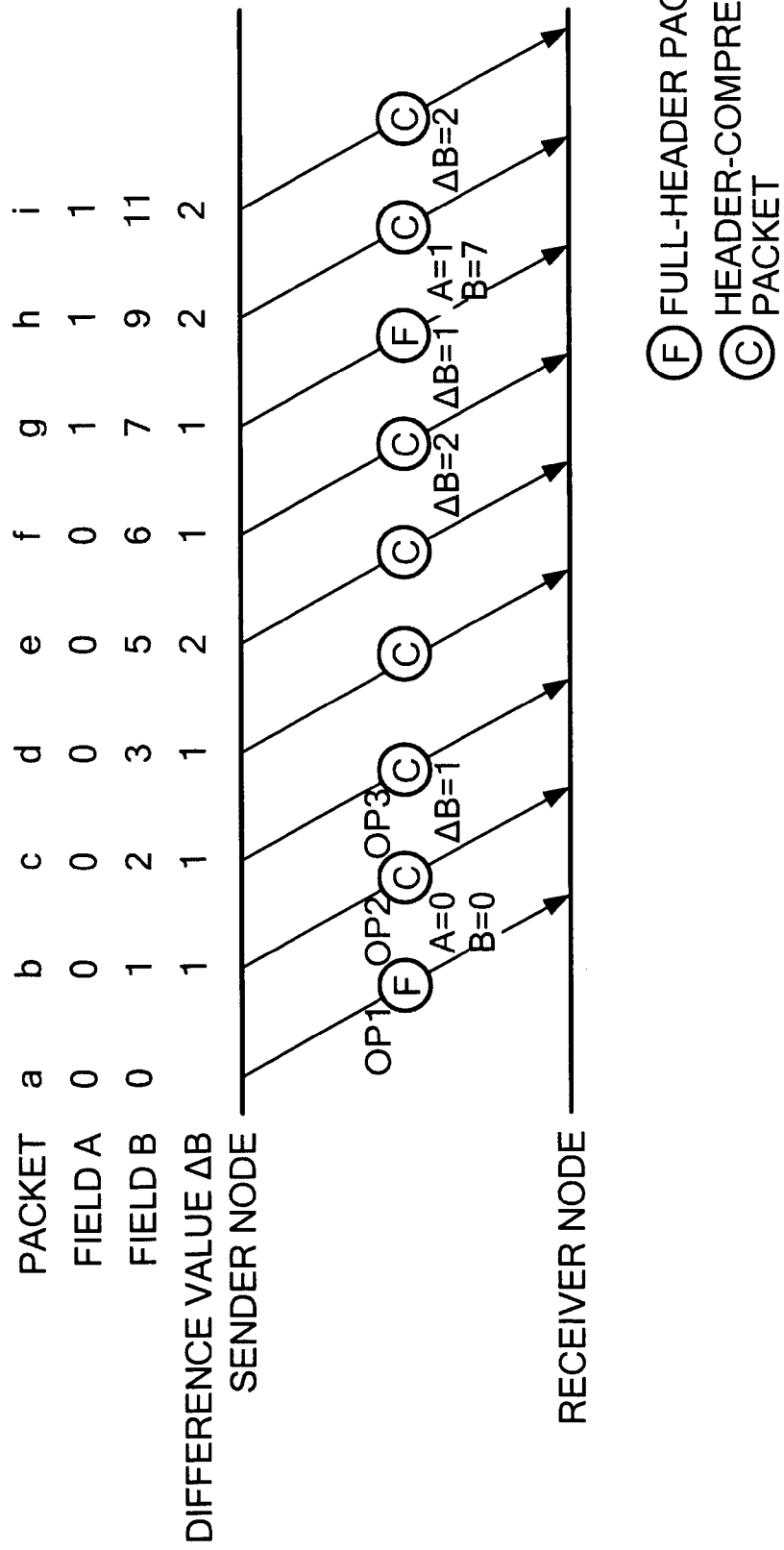
FIG. 14 is a timing chart illustrating steps of the packet transmitting method according to the related art of the present invention (method A).
Figure 15:
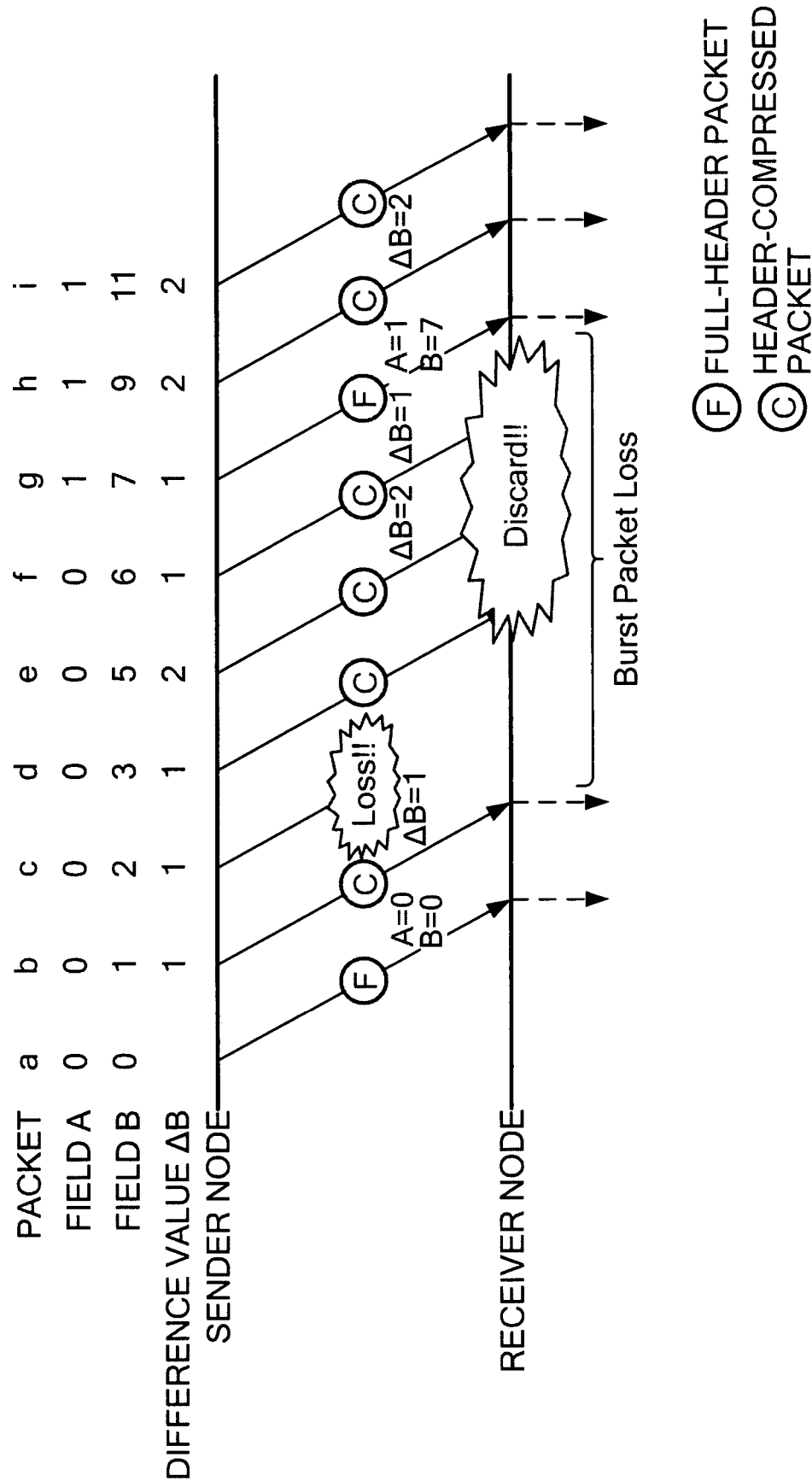
FIG. 15 is a timing chart explaining the problem in the packet transmitting method according to the related art.
Figure 16:
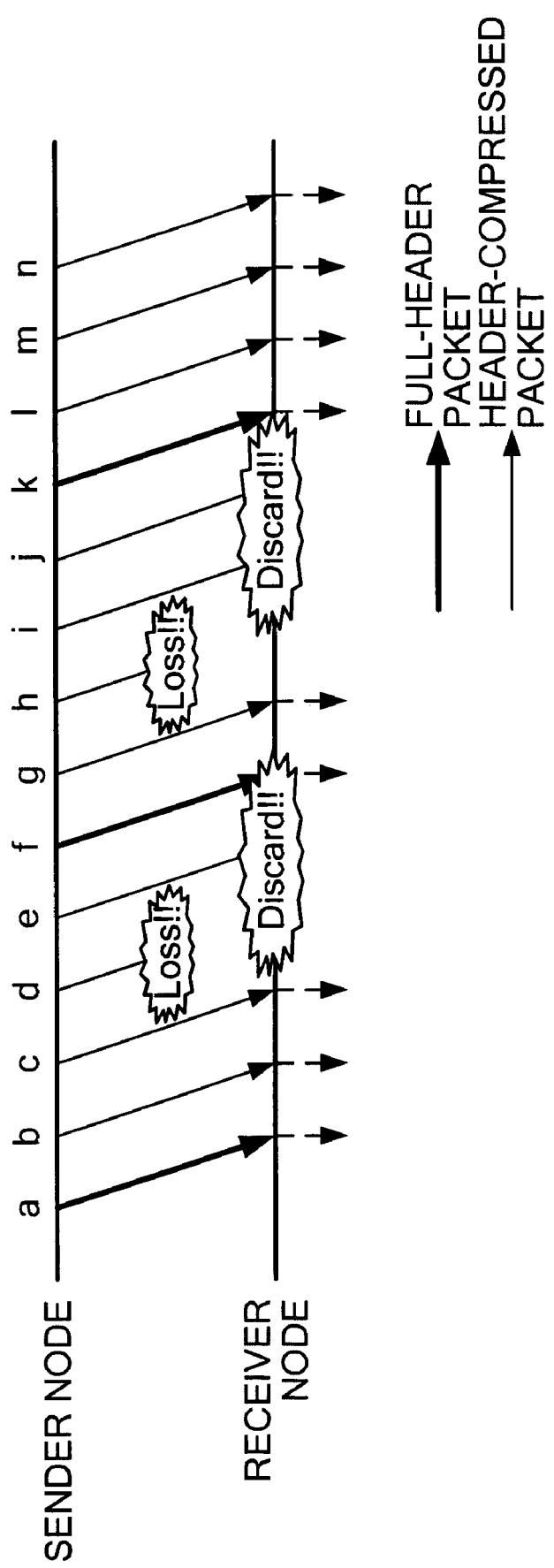
FIG. 16 is a timing chart illustrating steps of another packet transmitting method according to the related art (method 1).
Figure 17:
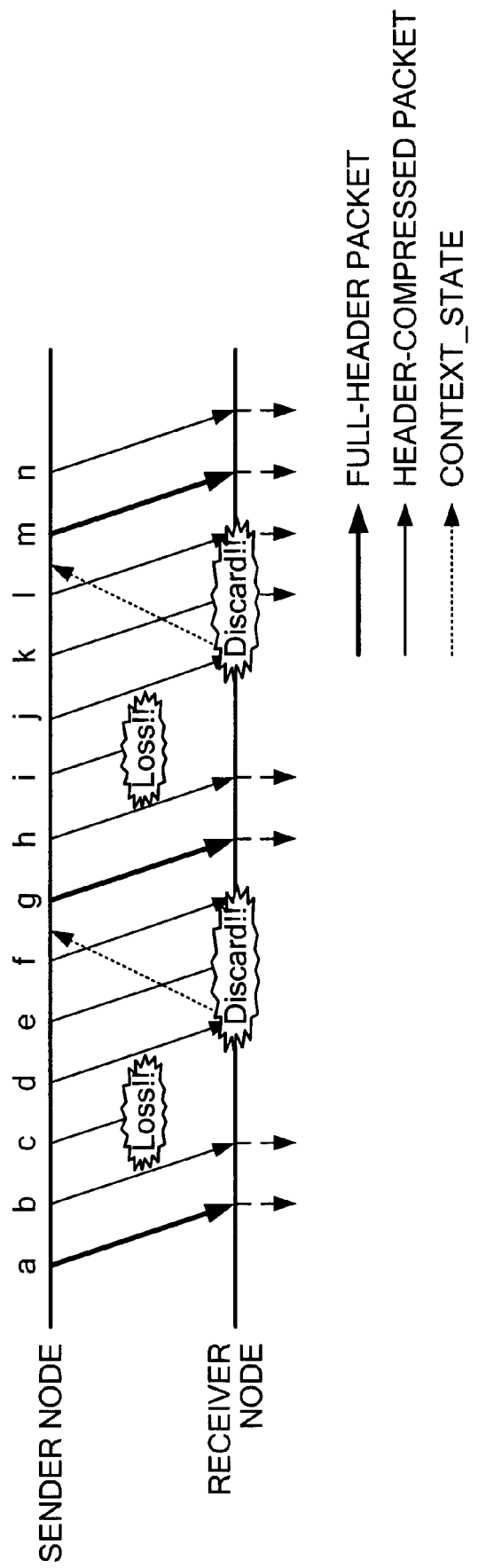
FIG. 17 is a timing chart illustrating steps of another packet transmitting method according to the related art (method 2).
Figure 18:
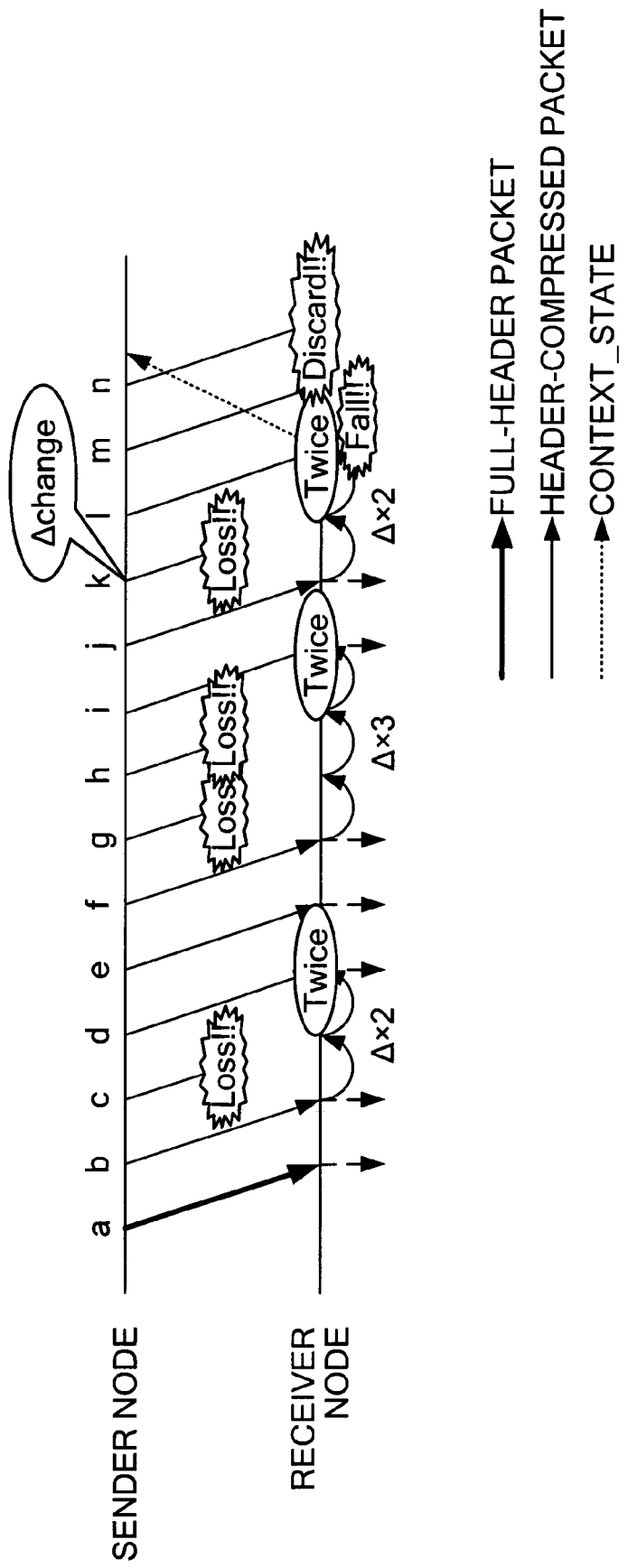
FIG. 18 is a timing chart illustrating steps of another packet transmitting method (method 3) according to the related art.
Figure 19:
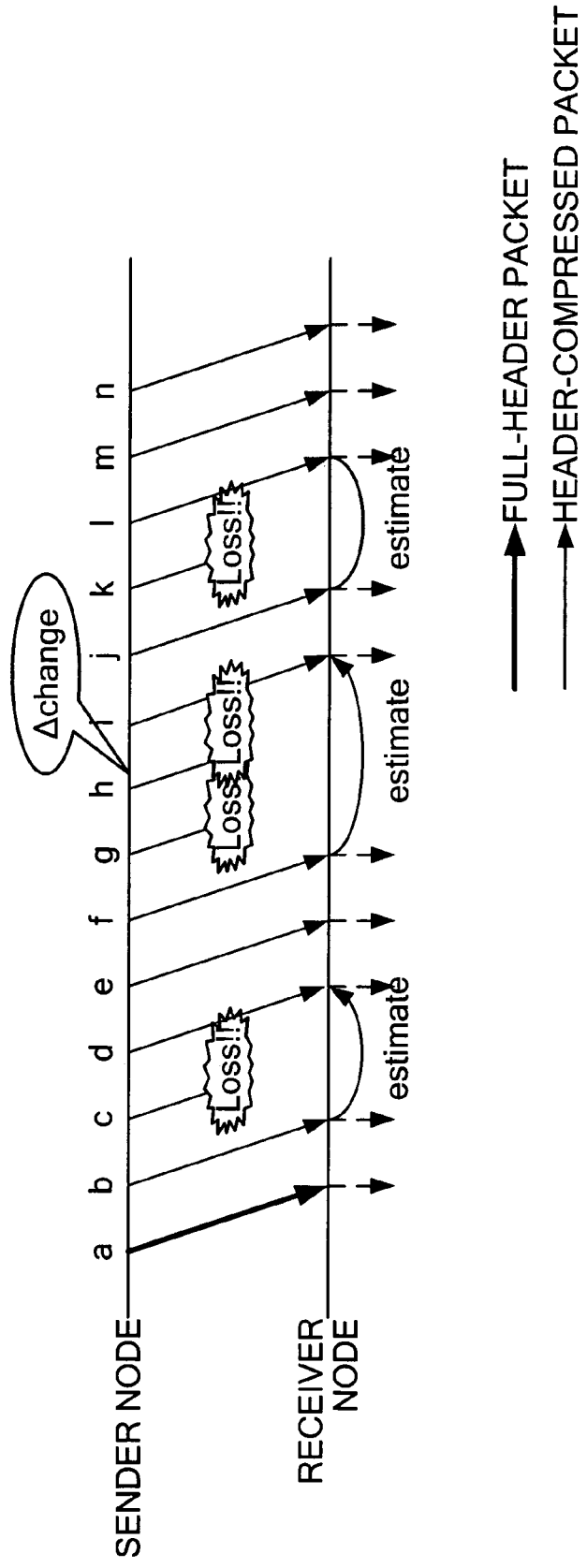
FIG. 19 is a timing chart illustrating steps of another packet transmitting method according to the related art (method 4).

On the other hand, for the IP packet to be transmitted as a header-compressed packet, the control portion 33a produces the compressed header based on the content of the IP packet stored in the storage portion 34a (refer to FIG. 13B)) in the same manner as described in the conventional art, and sends the header-compressed packet containing the compressed header to the transmitting portion 32a.

The foregoing is a processing implemented by the control portion 33a at the sender node 3a.

The relay apparatus on the receiver node 3b has the same structure as those of the sender node 3a. More specifically, the relay apparatus on the receiver node 3b includes the receiving portion 31b for receiving the packet from the sender node 3a, the control portion 33b for controlling each portion in the receiver node 3b, the storage portion 34b and a transmitting portion 32b for transmitting the packet outputted from the control portion 33b to the receiver data terminal 2. However, the control portion 33b at the receiver node 3b converts the full-header packet or the header-compressed packet transmitted from the sender node 3a into the IP packet and outputs to the transmitting portion 32b, contrary to the control portion 33a at the sender node 3a described above.

A-2: Operation of the First Embodiment

Then, the practical operation carried out between the relay apparatuses on the sender node 3a and the receiver node 3b is described with reference to FIG. 3. In FIG. 3, the case is assumed where the video data containing several frames is transmitted from the transmitter data terminal 1. Practically, the packets a1 to a5 are IP packets containing the data of the frame A. The packets b1 to b5 are IP packets containing the data of the frame B. The packets c1 to c5 are IP packets containing the data of the frame C. In addition, for the convenience to explain, as described in ① above, it is assumed hereunder that only the IP packet containing the first data of each frame is decided to be the important packet.

First of all, when receiving the first IP packet to be transmitted from the transmitter data terminal 1 through the receiving portion 31a, the control portion 33a at the sender node 3a converts the RTP/UDP/IP header in the IP packet a1 into the full header, and stores the content of the full header into the storage portion 34a. Then, the control portion 33a sends the full-header packet at containing the full header to the receiver node 3b through the transmitting portion 32a.

Then, when receiving the IP packet a2 from the transmitter data terminal 1, the control portion 33a in the sender node 3a examines whether or not the marker bit M in the RTP header is set. In this case, since the IP packet a2 is not the last packet of the frame A, the marker bit M is not set. Then, the control portion 33a converts the RTP/UDP/IP header in the IP packet a2 into the compressed header based on the content in the full header of the packet a1 retained in the storage portion 34a, and sends the header-compressed packet a2 to the receiver node 3b. Hereafter, the control portion 33a at the sender node 3a conducts the same process in relation to the packets a3 and a4.

Then, when receiving the packet a5 from the transmitter data terminal 1, the control portion decides whether the marker bit M in the RTP header is set or not. In this case, since the IP packet a5 is the last packet of the frame A, the marker bit M is set. Accordingly, the control portion 33a decides that the IP packet received next to the packet a5 is the important packet. As for the IP packet a5, the control portion converts the RTP/UDP/IP header in the IP packet into the compressed header and sends to the receiver node 3b in the same manner as described in relation to the IP packets a2 to a4.

Then, the control portion 33a receives the IP packet b1. In this case, since it is clear that the IP packet b1 is the important packet (i.e., the IP packet b1 is the first packet of new frame B) because the maker bit M in the IP packet a5 is set, the control portion 33a converts the RTP/UDP/IP header of the packet b1 into the full header, and writes the content of the full header into the storage portion 34a, and then, sends the full-header packet b1 containing the full header to the receiver node 3b. As for the IP packets b2 to b5 received afterward, the control portion sends them as header-compressed packets to the receiver node 3b in the same manner as described above in relation to the IP packets a2 to a5.

On the other hand, when receiving the full-header packet a1 from the sender node, the receiver node 3b converts the full header contained therein into the RTP/UDP/IP header, and stores the thus obtained IP packet a1 into the storage portion 34b while sending it to the receiver data terminal 2.

Then, the control portion 33b at the receiver node 3b restores the compressed header in the header-compressed packet a2 received through the receiving portion 31b, based on the content of the RTP/UDP/IP header in the IP packet a1 retained in the storage portion 34b, and sends it as the IP packet containing the RTP/UDP/IP header to the receiver data terminal 2. As for the packet a3 received next, the control portion 33b in the receiver node 3b restores the IP packet, and then sends it to the receiver data terminal 2 in the same manner as described above.

On the other hand, the example as shown in FIG. 3 exemplifies the case in which the header-compressed packet a4 transmitted from the sender node 3a is lost before reaching the receiver node for some reason. In this case, the receiver node 3b detects that the packet a4 is lost by the fact that the link sequence number in the compressed packet a5 to be received next is not in sequence. Since the header-compressed packet a5 cannot be correctly restored unless the content of the header-compressed packet a4 is referred to, the control portion 33b in the receiver node 3b discards the packet received until the next full-header packet, i.e., the packet a5 is received. On the contrary, the packet b1 containing the first data of the frame B is not discarded like the packet a5 due to the loss of the packet a4, since the packet b1 is sent as the full-header packet.

As described above, in the packet transmitting method of the embodiment, the sender node 3a sends the important packet as the full-header packet to the receiver node 3b. Accordingly, even in the case where the packet transmitted from the sender node is lost for some reason, and the header-compressed packet thereafter is discarded due to the loss, the important packet is sent to the receiver data terminal 2 as far as the important packet itself is not lost between the sender node 3a and the receiver node 3b. More specifically, the important packet to display the images (or replay audio) is not discarded at the receiver node 3b due to the lost of the other packets. Therefore, the degree of the influence of the packet loss on the quality of the images at the receiver data terminal can be lowered (for example, the deterioration of the quality of the image displayed or the audio replayed), in comparison with the case in which the full-header packet is sent to the receiver node without considering whether or not the packet is the important packet, as described in the conventional art.

In the above, although there is described the case in which the IP packet next to the IP packet with the marker bit in the RTP header set, i.e., the IP packet containing the first data of the frame, is decided to be the important packet, the same operation as described above is applied to the case in which the other IP packet, namely the IP packets as shown in ② to ⑤ described above are decided to be the important packets.

A-3: Variation Example of the First Embodiment

Although the relay apparatus on the sender node 3a in the above first embodiment sends only the important packet as the full-header packet, the configuration is not limited to the above, and the following configurations are included.

VARIATION EXAMPLE 1

In the case in which the value in the static field in the RTP/UDP/IP header of the packet to be transmitted is not changed, it is possible to employ the method for making the full header packet only for the important packet and sending it as shown in the above embodiment. However, in the case in which the value in the static field is changed, the sender node 3a has to convert not only the important packet but also the packet with the static field changed into the full header packet, as shown in the conventional art A. More specifically, it may be configured so that the control portion 33a in the sender node 3a sends the full-header packet for not only the important packet but also the packet with the static field changed to the receiver node 3b.

VARIATION EXAMPLE 2

Figure 4A:
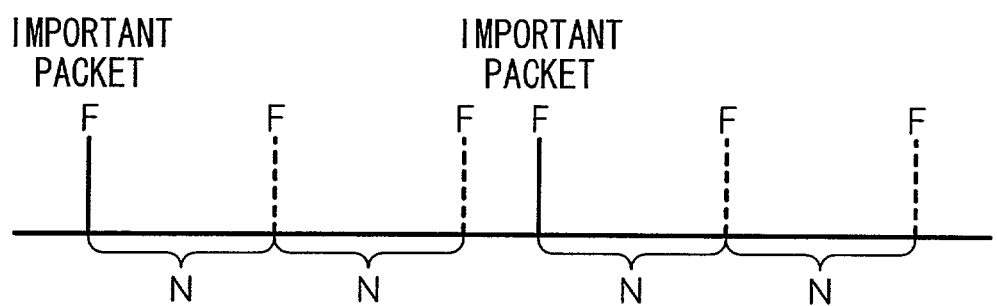
FIGS. 4A and 4B are timing charts showing packet transmissions according to modifications of the first embodiment.

In the case described above in which only the important packet is transmitted as the full-header packet, the intervals to send the full-header packets becomes longer when the number of the important packets to be transmitted is fewer in comparison with the number of the other packets. In this case, it may be considered that a lot of header-compressed packets received until the next full-header packet is received are discarded due to the loss of the header-compressed packet. In order to avoid the above situation, it may be configured so that when the prescribed time T has passed without receiving the important packet after sending the full-header packet F (in other words, without sending the full-header packet), the packet to be transmitted next is sent as the full-header packet F even if the packet is not the important packet, as shown in FIG. 4A. Alternatively, it may be configured so that when a specific number N of header-compressed packets are sent without receiving the important packet after sending the full-header packet F, the packet is sent as the full-header packet F regardless of the importance of the packet to be transmitted next.

Figure 4B:
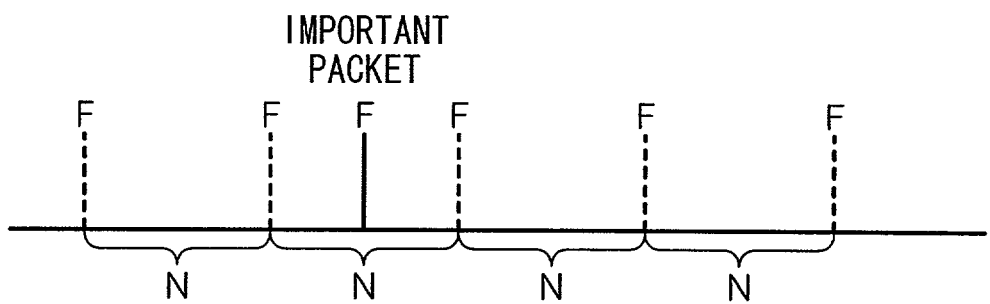

Furthermore, it can be configured so that the relay apparatus on the sender node converts a non-compressed packet into the full-header packet F and transmits the full-header packet to the receiver node even if the non-compressed packet is not the important packet, every time when a specific number N of packets are transmitted or packets ranging for a specific period of time T are transmitted, as shown in FIG. 4B.

With the use of the above methods, it is possible to avoid the situation in which the intervals of sending the full-header packets becomes longer, even in the case that the number of the important packets contained in the packets to be transmitted is few. Thus, it is advantageous in that the number of the packets discarded due to the packet loss is lowered.

In the case in which the content in the static field is possibly changed, even when the above configuration is applied, as same as in the above variation example 1, it is necessary to consider the packet with the content of the static field changed, in addition to the important packet, and the packet selected every specific fixed number as the object to which the full header is to be added.

VARIATION EXAMPLE 3

As described above in the conventional art as the method 2, it may be configured that when the receiver node 3b detects the packet loss between the sender node 3a and the receiver node 3b, the receiver node sends the CONTEXT_STATE which requests the transmission of the full-header packet to the sender node 3a. More specifically, it may be configured that the control portion 33a at the sender node 3a sends the important packet as the full-header packet, while the control portion sends the packet to be transmitted immediately after receiving the CONTEXT_STATE transmitted from the receiver node 3b as the full-header packet. It is also necessary in this variation example to consider that the packet with the static field changed is sent as the full header, as in the case of the variation example 2 described above.

VARIATION EXAMPLE 4

As the IP packet to be considered as the important packet, there are the following packets in addition to those listed in the above embodiment.

a. In the case in which the packet transmission is implemented to send video data obtained by an animated image compression coding algorithm containing an intra-frame coding process and an inter-frames prediction coding process (for example, the animated image coding algorithm corresponding to MPEG (Moving Picture Experts Group)), the IP packet containing the data obtained by the intra-frame coding process (namely, the coded data of the I frame) is assigned to be the important packet. The reason thereof is that unless the I frame is properly restored in the receiver, the following frames with the inter-frames prediction coding implemented with reference to the I frame are not properly restored.

b. In the case in which the packet transmission is implemented to send a layered coded data composed of the data of the base layer and the data of the enhanced layer, the IP packet containing the data of the base layer is assigned to be the important packet. The data of the base layer means the data which is highly important to restore the original information when the layered coded data is decoded at the receiver. In addition, the data of the enhanced layer means the data which is not so important as the data of the base layer, but serves to improve the quality of reproduction of the original information when it is properly decoded. For example, in the animated image compression coding algorithm in compliant with MPEG-2, a series of frames to be transmitted are divided into I frame, P frame and B frame. The intra-frame coding is implemented to the I frame. A unidirectional inter-frames prediction is implemented to the P frame with reference to the preceding I frame or P frame. A bidirectional inter-frames prediction coding is implemented to the B frame with reference to the I frame or P frame flowing before and after thereof. In this case, the coded data of the I frame and P frame are the data of the base layer, and the coded data of the B frame is the data of the enhanced layer. The decoder can reproduce the animated image, although a time resolution thereof is low, as far as at least the data of the base layer is correctly received. Thus, the data of the base layer is important so that the data of the base layer is transmitted as the important packet. When the data of the enhanced layer is decoded at the decoder, the B frame is used to compensate the time gap between the I frame and P frame, thus improving the time resolution of the animated image.

B. Second Embodiment

It is configured in the above first embodiment that the relay apparatus provided on the sender node 3a has a function to convert the IP packet into the header-compressed packet or the full-header packet (hereinafter referred to as a "compression function"), while the relay apparatus provided on the receiver node 3b has a function to convert the header-compressed packet or the full-header packet into the IP packet (hereinafter referred to as a "decompression function"). Contrary to the above, it is configured in the present embodiment that the transmitter data terminal and the receiver node 3b depicted in FIG. 1 have the compression function, while the sender node 3a and the receiver data terminal 2 have the decompression function.

Practically, the receiver data terminal 1 produces in sequence the IP packet to be transmitted, and then, decides whether each of the IP packets is the important packet or not in the same manner as the first embodiment. The transmitter data terminal 1 sends the IP packet decided to be the important packet as the full-header packet to the sender node 3a, while the transmitter data terminal 1 sends the remaining packets as the header-compressed packet to the sender node 3a.

On the other hand, the relay apparatus provided on the sender node 3a converts the received header-compressed packet or the full-header packet into the IP packet and sends it to the receiver node 3b. Furthermore, the relay apparatus on the receiver node 3b decides whether each of the received IP packets from the sender node 3a is the important packet or not, and sends the IP packet decided to be the important packet as the full-header packet to the receiver data terminal 2, while sending the remaining IP packet as the header-compressed packet to the receiver data terminal 2. The receiver data terminal 2 restores the IP packet on the basis of the received full-header packet or the header-compressed packet from the receiver node 3b, and then displays the images or replays the audio or the like in accordance with the data contained in each of the packets. The same effect as in the first embodiment can be obtained in the above configuration.

As described above, it may be configured that the transmitter data terminal has a function to send the important packet in the IP packets to be transmitted as the full-header packet. More specifically, the packet transmission method of the present invention is applicable to the arbitrary devices to implement the packet transmission and reception in the network. In other words, "the transmitter" and "the receiver" defined in the claims are not limited to a packet relaying device to transfer the exchanged packet between the data terminals, but are the concept including the data terminal which is the sender of the packet, and the data terminal which is the destination of the packet.

Also in this embodiment, the transmitter may be configured to consider, as the packet to be transmitted as the full header packet, not only the important packet, but also the IP packet with the static field changed as described in the variation example of the first embodiment (variation example 1), the IP packet to be transmitted after passing a specific period without sending the IP packet or the full-header packet which is intended to be transmitted after transmitting a fixed number of the header-compressed packet without sending the full-header packet (variation example 2), and the IP packet to be transmitted after receiving the CONTEXT_STATE from the sender node 3a.

C. Third Embodiment

Figure 5:
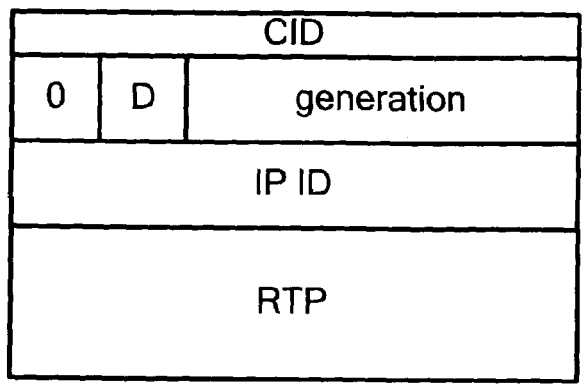
FIG. 5 is a format of the header of the Compressed non-TCP packet transmitted in the second embodiment of the present invention.

As in the case of the embodiments described above, this embodiment supposes that the packet is transmitted by means of the non-TCP protocol such as UDP. RFC2507 defined the compressed non-TCP header having the format shown in FIG. 5 as the compressed header which can be used for non-TCP packets. There are cases in which the fields for ID of IP and RTP in the header of the non-TCP packet are changed packet by packet. The compressed non-TCP header contains the fields composed of those fields having data which could be changed packet by packet. For convenience, the field thus contained in the compressed non-TCP header will be referred to as a "replace field." ID of IP and RTP shown in FIG. 5 are respectively the replace fields. Each compressed non-TCP header is generated with reference to a full header prior thereto. CID shown in FIG. 5 is the information identifying the full header which is referred to for generating the compressed non-TCP header. The "generation" is the field which is updated when a change is made in the constant fields of the full header.

When receiving a compressed non-TCP header sent from the sender node, the communication apparatus on the receiver node refers to the compressed non-TCP header as well as the full header which is identified by CID contained in the compressed non-TCP header, and generates a header having the replace fields of the compressed non-TCP header and the other fields of the full header. The communication apparatus then uses the generated header for processing the non-TCP packet.

Figure 6A:
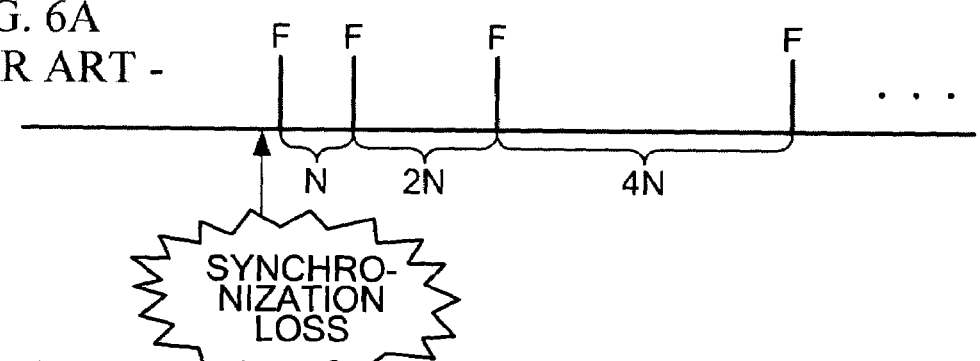
FIG. 6A is a timing chart showing the transmitting method of the full-header packet when transmitting the non-TCP packet.

There are cases where so-called synchronization loss occurs during delivering non-TCP packets from the sender node to the receiver node. In RFC2507, there is a proposal of a method for quickly recovering from the synchronization loss. According to the proposal, the full header is repeatedly transmitted at the exponentially increasing interval, as shown in FIG. 6A.

The foregoing is the outline of the header compression method for non-TCP packets proposed in RFC2507.

Figure 6B:
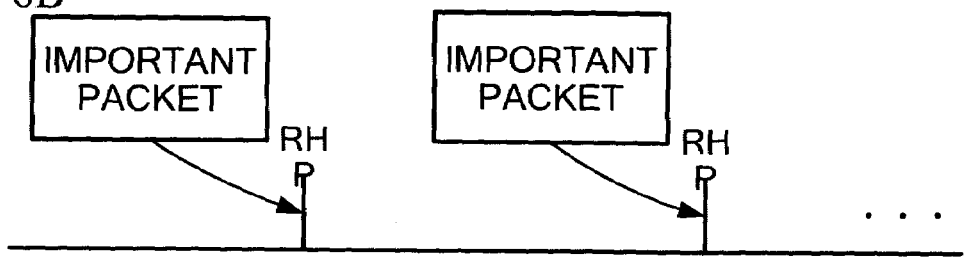
FIG. 6B is a timing chart showing the transmitting method of the full-header packet in the present embodiment.
Figure 6C:
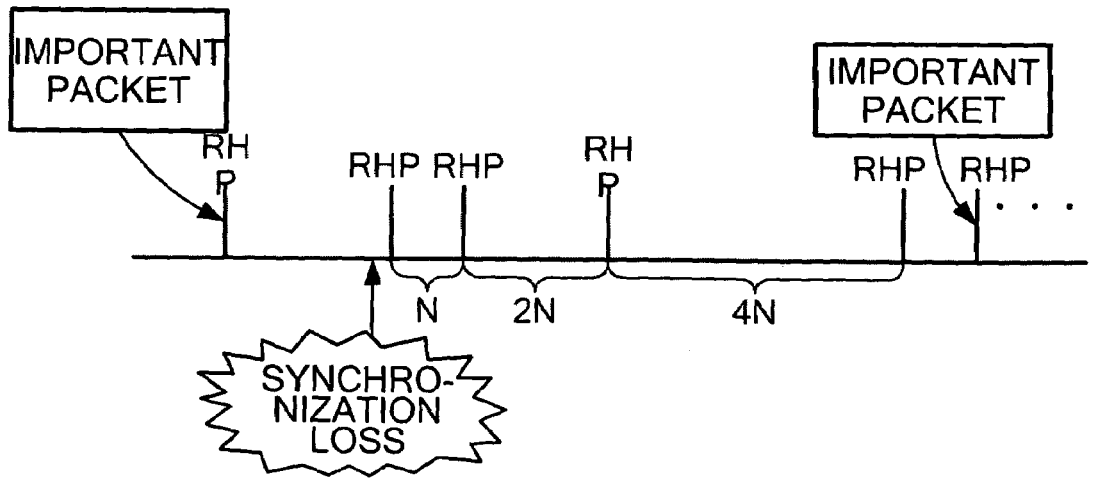
FIG. 6C is a timing chart showing other example of the transmitting method of the full-header packet in the present embodiment.

The present embodiment is that the present invention is applied to the above-mentioned header compression method for the non-TCP packets. FIGS. 6B and 6C show examples of the packet transmission method of the present embodiment, respectively.

In the transmission method as shown in FIG. 6B, when the important packet is transmitted, a refresh-header packet RHP including the compressed non-TCP header instead of the full header is transmitted. The compressed non-TCP header includes all information necessary for recovering from the synchronization loss. Therefore, the same effect as those of the first embodiment is obtained even if the compressed non-TCP header is transmitted instead of the full header.

In the transmission method as shown in FIG. 6C, the important packet is transmitted as the refresh-header packet RHP, while the refresh-header packet is intermittently transmitted until the refresh header packet RHP corresponding to the important packet appears, when the synchronization loss occurs. In this case, while the time intervals or the numbers of the packets between two consecutive refresh-header packets RHP are increased exponentially, the refresh-header packets RHP are repeatedly transmitted.

In this embodiment, the same effect as those in the first embodiment can be obtained.

D. Fourth Embodiment

There is another header compression method of the IP packet, ROHC (Robust Header Compression), issued as an Internet-Draft. This embodiment relates to the method of the packet compression and transmission using the ROHC method.

In the first to third embodiments already described, the full header containing the content of the original header is transmitted at the time of starting the packet delivery and during the packet delivery, as a refresh header to recover the synchronization at the receiver. In the method of the packet compression and transmission using the ROHC, a refresh header with the format other than the full header is transmitted from the transmitter and the synchronization is recovered at the receiver. Hereunder, the outline of the ROHC is described to help understanding of the technical signification of the present embodiment.

Figure 7:
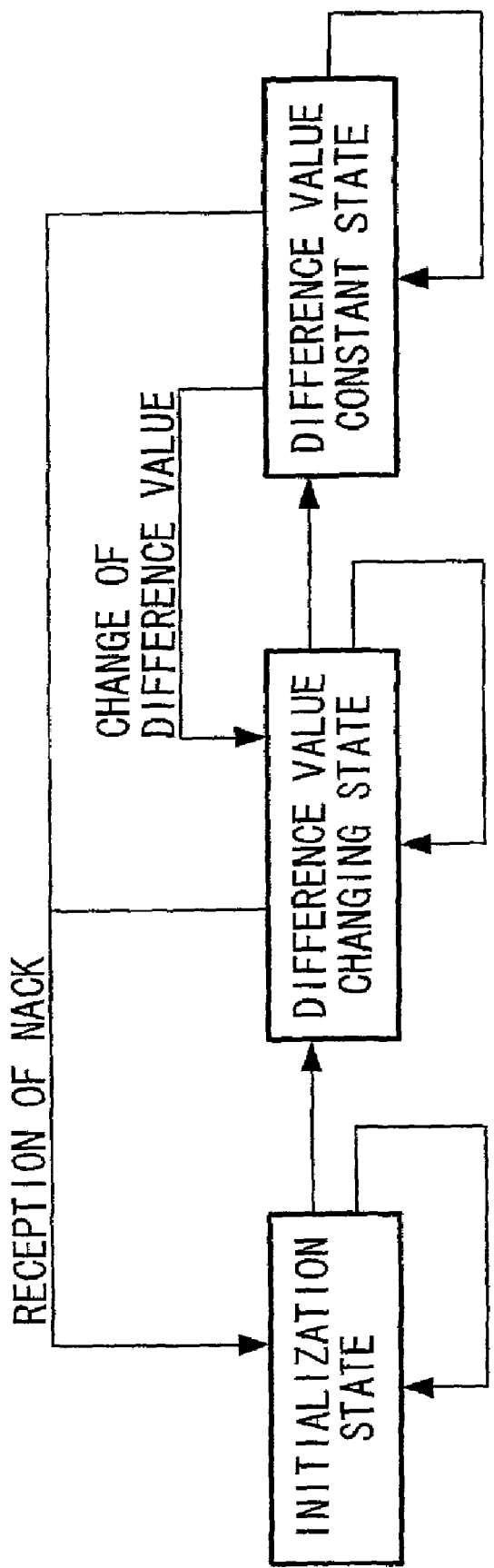
FIG. 7 shows a state of transition in the header compression process and reconstruction process by means of ROHC.

FIG. 7 shows a transition of the compression state used in the ROHC. As depicted in the drawing, the ROHC has three kinds of the compression states.

When the packet delivery accompanying the header compression is carried out between the sender node and the receiver node, the compression process and reconstructing process are started from the initialization state in the sender node and the receiver node. Furthermore, when the synchronization loss occurs during the packet transmission and reception, the compression process and the reconstruction process have to return to the initialization state, in order to recover the synchronization between the sender node and the receiver node. When a certain condition is satisfied after the compression process and the reconstruction process are initialized, the state of the compression process at the sender node and the state of the reconstruction process at the receiver node are transferred to the difference value changing state which is the further upper state. When a certain condition is satisfied in this state, the processing states of the compression and reconstruction are transferred to the difference value constant state which is the further upper state. As the processing states of the compression and reconstruction are transitioned to the upper state, the size of the compressed header to be transmitted becomes smaller.

Figure 8A:
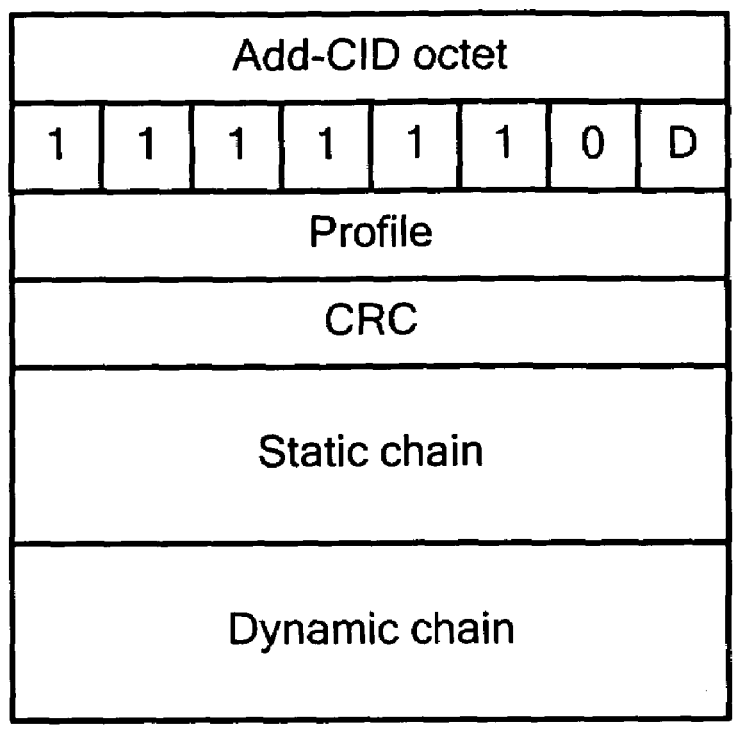
FIG. 8A shows a format of IR header in ROHC.
Figure 8B:
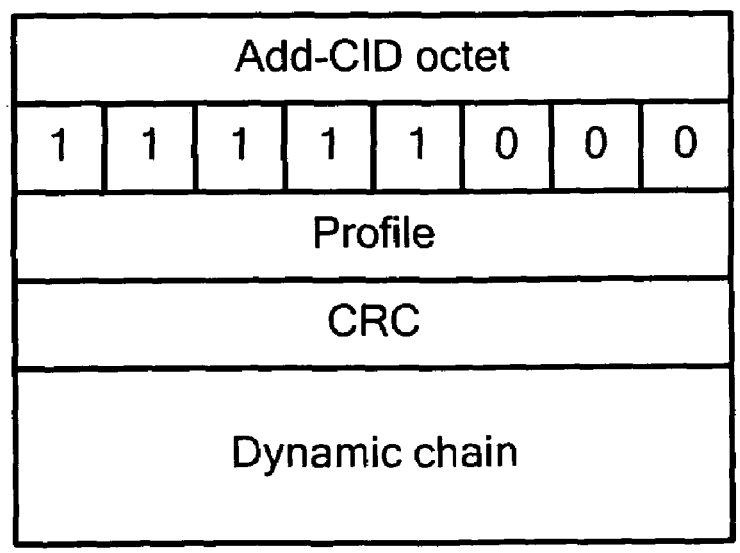
FIG. 8B shows format of IR-DYN header in ROHC.

In the initialization state, the IR header depicted in FIG. 8A or the IR-DYN header depicted in FIG. 8B is transmitted.

The IR header is produced from the IP/UDP/RTP header of the first packet in order to initialize the compression process and the reconstruction process, when the packet delivery using the header compression starts. In FIG. 8A, the Static Chain consists of the information of the Static field which is not changed packet by packet in the IP/UDP/RTP header. The Dynamic chain consists of the information of the Dynamic field which can be changed packet by packet in the IP/UDP/RTP header.

The IR-DYN header is produced at the time when the synchronization loss occurs during the packet delivery and the initialization of the reconstructing process of the header is required at the receiver, after the header compression is already started, and sent to the receiver. The IR-DYN header contains only the Dynamic chain, as depicted in FIG. 8B. Since the Dynamic chain includes all the information of the Dynamic field, the synchronization is recovered by the reception thereof at the receiver node.

Both the IR header and the IR-DYN header contain CRC computed from the original IP/UDP/RTP header. The node receiving the IR header and the IR-DYN header can examine whether each header is properly restored or not by the use of the CRC.

The communication apparatus on the sender node monitors, between the packets, the difference of the Dynamic field of the IP/UDP/RTP header for the packets to be transmitted in order. When there is no change in the difference (namely, difference value constant state), the header-compressed packet containing Type-0 as depicted in FIG. 9A is produced and transmitted to the receiver node. In FIG. 9A, SN represents the sequence number of the RTP. The receiver node learns that there is no change in difference of the Dynamic field between the packets, when receiving the Type-0 header. Then, only the difference available by that time in the Dynamic field is added to the present value thereof to reconstruct the Dynamic field.

When the communication apparatus on the sender node recognizes the change in the difference (namely, difference value changing state), the communication apparatus on the sender node produces the header-compressed packet containing Type-1 header or Type-2 header to transfer the new difference to the receiver node, and transmits it to the receiver node. The format of the Type-1 header is depicted in FIG. 9B, and the format of the Type-2 header is depicted in FIG. 9C. In those drawings, SN represents information relating to the difference in RTP sequence number, and TS represents information relating to the difference in RTP timestamp. It is arbitrary that which one of the Type-1 header or the Type-2 header is transmitted.

Figure 10:
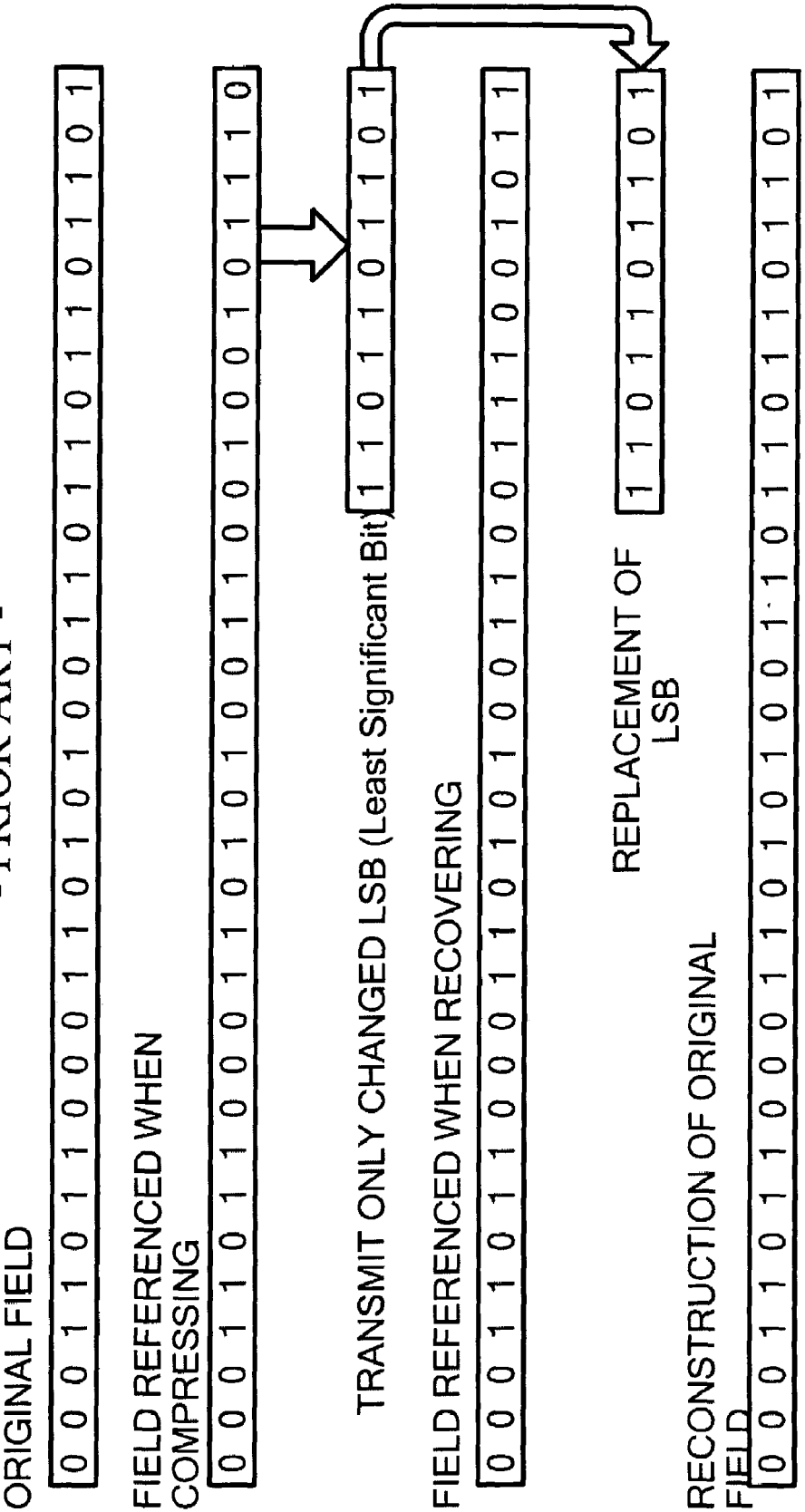
FIG. 10 shows steps of LSB coding used in ROHC.

The information relating to the difference mentioned above is obtained by LSB (Least Significant Bit) coding of the corresponding field. FIG. 10 shows the steps of the LSB coding.

In this method, when the difference in some field of header between the packets is changed, one or more packets prior to the packet to be compressed are selected as reference packets. It is arbitrary that which packets are selected as the reference packets. The field of header of the packet to be compressed and the corresponding field of header of the reference packet thus selected are compared with each other, and then the different lower bits are transmitted. In the example depicted in FIG. 10, since the lower four bits are different, the lower four bits are transmitted to the receiver node by the Type-1 header or the Type-2 header. In the receiver node, the lower four bits in the corresponding field of the header of the reference packet are replaced by the data of the lower four bits in the Type-1 header or the Type-2 header, thus the original field can be reconstructed.

The foregoing is the outline of the present ROHC proposed in the Internet-Draft.

Figure 11:
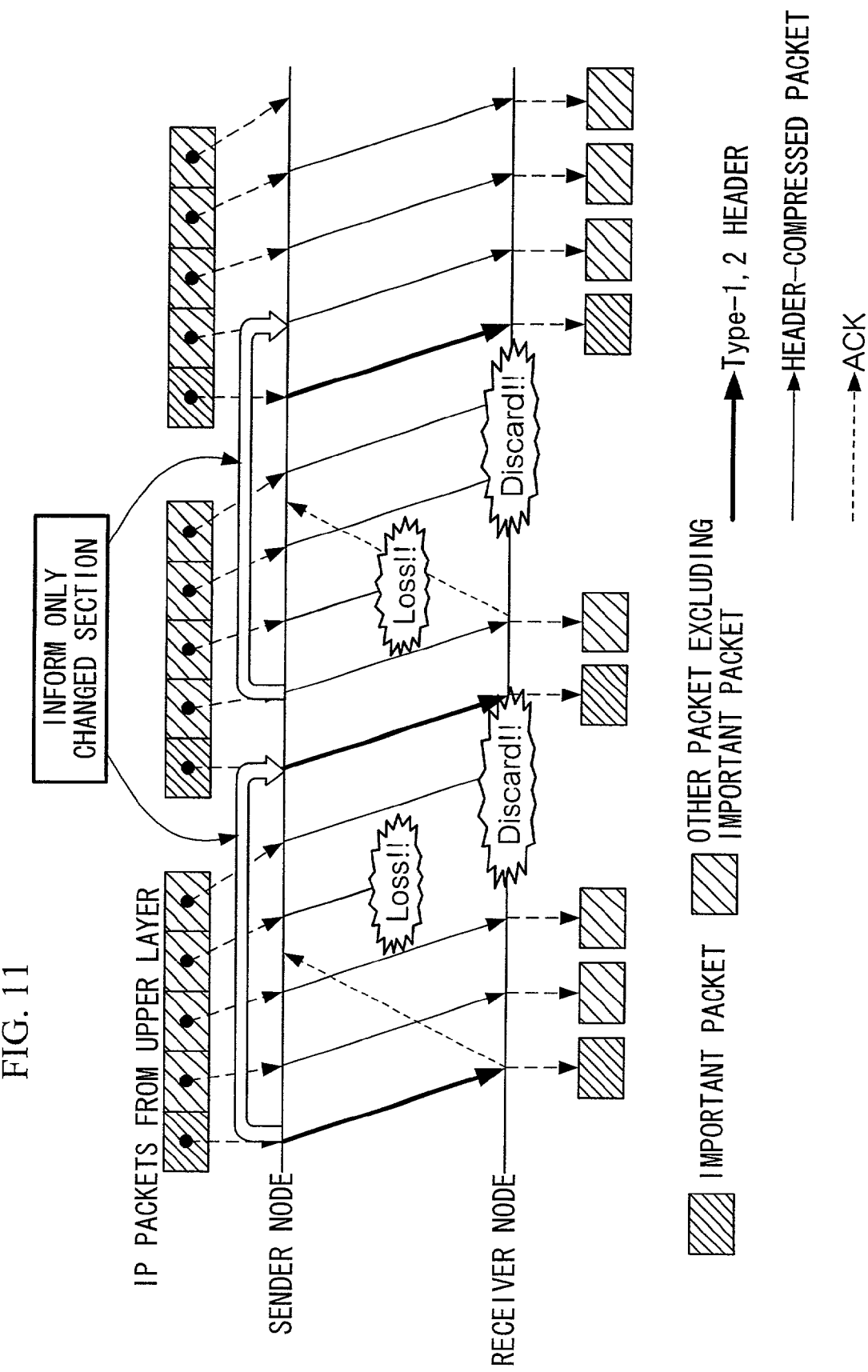
FIG. 11 shows the packet transmitting method in the present embodiment.

FIG. 11 depicts the packet transmitting method in the present embodiment.

In the present embodiment, when the important packet is transmitted, the IP/UDP/RTP header of the important packet is converted into either one of the IR header, the IR-DYN header, the Type-1 header or the Type-2 header, and the refresh-header packet containing the header thus converted is transmitted to the receiver node. More detailed description will be given as follows:

In the header compressed packet transmission according to ROHC, there are cases in which when the header is received by the communication apparatus on the receiver node and the content of the header is correctly restored, the ACK is transmitted from the receiver node to notify the sender node of the matter. In the present embodiment, when the important packet to be transmitted is generated after receiving such an ACK from the receiver node, the Type-1 header or the Type-2 header is generated from the IP/UDP/RTP header of the important packet with reference to the earlier header which has already been transmitted and acknowledged. The refresh header packet containing the Type-1 or Type-2 header thus generated is then transmitted to the receiver node. The Type-1 or Type-2 header thus transmitted contains the data indicating the difference between the Dynamic field in the IP/UDP/RTP header of the important packet and that of the acknowledged packet for which the ACK has already been received by sender node.

Since the Type-1 header or the Type-2 header contains the information enough to recover the synchronization, even when the packet loss occurs before transmitting the important packet, the header in the important packet is correctly reconstructed without any problems. Thus, the important packet is protected from the packet loss causing the synchronization loss.

There are cases in which when the important packet is transmitted, but there is no header which has already been sent and acknowledged. In such cases, the IR header or the IR-DYN header is generated from the IP/UDP/RTP header of the important packet and the refresh-header packet containing it is transmitted to the receiver node.

In the present embodiment, the important packet can be protected from the packet loss causing the synchronization loss.

E. Variation Example of Each of the Above Embodiments

Figure 12:
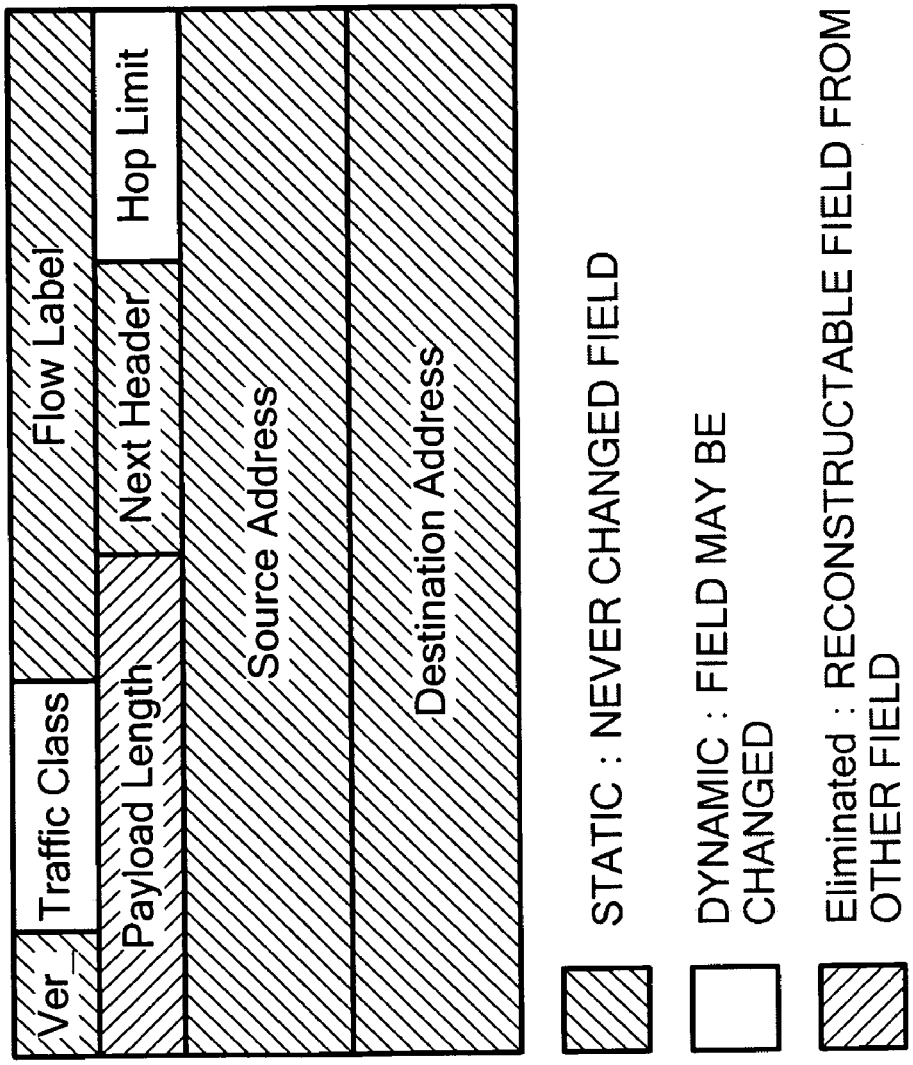
FIG. 12 shows a format of the IPv6 header used in the variation example of each of the embodiments.

Each of the above embodiments described above discloses the packet transmitting method applied to the transmission of the IPv4 packet. However, the applicable scope of the present invention is not limited to the above. The present invention can be applied to the transmission of the IPv6 packet. FIG. 12 shows the format of IPv6 header. As shown in the drawing, The IPv6 has the STATIC field which is not changed between the packets, the DYNAMIC fields which may be changed between the packets, and the Eliminated field which has a known value or can be reconstructed from other field. Accordingly, the packet transmitting method described in each of the embodiments or the variations thereof can be applied to the non-compressed packet having the IP/UDP/RTP header in which the IP portion consists of the IPv6 header.

The present invention can be embodied so as to record the program for executing the packet transmitting method of the present invention into storage media readable by computers and distribute the storage media to users, or provide such a program to users through electronic communication circuits.

What is claimed is:

1. A packet transmitting method for transmitting packets from a sender node to a receiver node through a network, comprising the steps of:

determining by a communication apparatus provided at the sender node, whether each non-compressed packet to be transmitted is an important packet, on the basis of a header, a timestamp, or size of each non-compressed packet;

converting by the communication apparatus provided at the sender node, each non-compressed packet which is determined to be an important packet into a refresh-header packet, the refresh-header packet including a refresh header, the refresh header including enough information to recover synchronization in the receiver node; and transmitting a packet stream containing the refresh-header packet and a header-compressed packet to the receiver node, the header-compressed packet including a compressed header, the compressed header including less information than the refresh header.

2. The packet transmitting method of claim 1, wherein the refresh header is a full header containing a content of an original header included in the non-compressed packet.

3. The packet transmitting method of claim 1, wherein a format of the refresh header comprises a first format which can be used in a first initialization of a reconstruction process in the communication apparatus at the receiver node beginning to receive the packet stream, and a second format which can be used in a second initialization and following initialization, and the communication apparatus at the sender node converts the important packet in each of second and following packets in the packet stream into the refresh-header packet containing a refresh header whose header is the second format, and the communication apparatus at the sender node transmits to the receiver node the refresh-header packet.

4. The packet transmitting method of claim 1, wherein the refresh header is a header produced with reference to a header which has already been transmitted to the receiver node and acknowledged by the receiver node.

5. The packet transmitting method of claim 1, wherein the communication apparatus at the sender node determines whether each one of the non-compressed packets is an important packet, on the basis of a condition of marker bits of real-time transport protocol headers included in the non-compressed packets.

6. The packet transmitting method of claim 5, wherein a non-compressed packet is determined as the important packet when a non-compressed packet transmitted immediately prior to the non-compressed packet has the marker bit set.

7. The packet transmitting method of claim 5, wherein a non-compressed packet is determined as the important packet when the non-compressed packet has the marker bit set.

8. The packet transmitting method of claim 1, wherein the communication apparatus at the sender node determines whether each one of the non-compressed packets to be transmitted is an important packet, on the basis of packet sizes of the non-compressed packets.

9. The packet transmitting method of claim 8, wherein a non-compressed packet is determined as the important packet when the non-compressed packet has a larger size than a predetermined size.

10. The packet transmitting method of claim 8, wherein a non-compressed packet is determined as the important packet when the non-compressed packet has a larger size than a predetermined size and the next non-compressed header has a smaller size than a predetermined size or when the non-compressed packet has a smaller size than the predetermined size and the next non-compressed header has a larger size than the predetermined size.

11. The packet transmitting method of claim 1, wherein a non-compressed packet is determined to be an important packet when the non-compressed packet contains configuration information which is referred to in order to interpret data in the packet in the receiver node.

12. The packet transmitting method of claim 1, wherein the data in each of the packets comprises at least part of image data representing an image for several frames, and the important packet comprises a packet containing the first information in each of said frames.

13. The packet transmitting method of claim 12, wherein a non-compressed packet is determined as the first packet of the frame when the non-compressed packet contains a timestamp different from a timestamp contained in a preceding non-compressed packet.

14. The packet transmitting method of claim 1, wherein data in each of the packets represents a voice, and a non-compressed packet is determined to be an important packet when the non-compressed packet contains data representing a voice portion.

15. The packet transmitting method of claim 14, wherein the non-compressed packet containing data representing the voice portion is obtained on a basis of a change in packet size of a set of non-compressed packets to be transmitted.

16. The packet transmitting method of claim 1, wherein:
data in each of the packets comprises at least a part of coded data representing image for several frames obtained by means of an algorithm containing intra-frame coding process and inter-frames prediction coding process, and a non-compressed packet is determined to be an important packet when the non-compressed packet comprises a packet containing a coded data obtained by the intra-frame coding process.

17. The packet transmitting method of claim 1, wherein:
data in each of the packets comprises at least part of a layered coded data consisting of data in a base layer and data in an enhanced layer, and a non-compressed packet is determined to be an important packet when the non-compressed packet comprises a packet containing the data in said base layer.

18. The packet transmitting method of claim 1, wherein the communication apparatus at the sender node converts a non-compressed packet into a full-header packet even if the non-compressed packet is not an important packet, when a prescribed time has passed or a prescribed number of compressed-header packets has been transmitted after transmission of a last full-header packet.

19. The packet transmitting method of claim 1, wherein the communication apparatus at the sender node transmits the refresh-header packet every time when a specific number of packets are transmitted or packets ranging for a specific period of time are transmitted.

20. The packet transmitting method of claim 1, wherein when a synchronization loss occurs in a packet communication, the communication apparatus at the sender node transmits a refresh-header packet while transmission intervals thereof are exponentially increased.

21. The packet transmitting method of claim 1, wherein the communication apparatus at the sender node transmits a non-compressed packet to be transmitted as a refresh-header packet, in response to a request from the receiver node.

22. A program for causing a computer to execute a packet transmitting method for transmitting packets from a sender node to a receiver node through a network, the method comprising the steps of:
determining by a communication apparatus provided at the sender node, whether each non-compressed packet to be transmitted is an important packet, on the basis of a header, a timestamp, or size of each of the non-compressed packets;

converting by a communication apparatus provided at the sender node, each non-compressed packet which is determined to be an important packet into a refresh-header packet, the refresh-header packet including a refresh header, the refresh header including enough information to recover synchronization in the receiver node; and transmitting a packet stream containing the refresh-header packet and the header-compressed packet to the receiver node, a header-compressed packet including a compressed header, the compressed header including less information than the refresh header.

23. A computer readable storage media for storing a program which makes a computer execute a packet transmitting method for transmitting packets from a sender node to a receiver node through a network, the method comprising the steps of:
determining by a communication apparatus provided at the sender node, whether each non-compressed packet to be transmitted is an important packet, on the basis of a header, a timestamp, or size of each of the non-compressed packets;

converting by the communication apparatus provided at the sender node, each non-compressed packet which is determined to be an important packet into a refresh-header packet, the refresh-header packet including a refresh header, the refresh header including enough information to recover synchronization in the receiver node; and transmitting a packet stream containing the refresh-header packet and a header-compressed packet to the receiver node, the header-compressed packet including a compressed header, the compressed header including less information than the refresh header.

24. A relay apparatus provided in a network for receiving packets from a sender node of the network and transmitting the packets to a receiver node of the network, the relay apparatus comprising:

a determining unit that determines whether each non-compressed packet to be transmitted is an important packet, on the basis of a header, a timestamp or size of each of the non-compressed packet;

a compresser that converts each non-compressed packet which is determined to be an important packet into a refresh-header packet, the refresh-header packet including a refresh header, the refresh header including enough information to recover synchronization in the receiver node; and a transmitter that transmits a packet stream containing the refresh-header packet and a header-compressed packet to the receiver node, the header-compressed packet including a compressed header, the compressed header including less information than the refresh header.

25. A data terminal comprising:

a determining unit that determines whether a non-compressed packet to be transmitted is an important packet, on the basis of a header, a timestamp or size of the non-compressed packet;

a compresser that converts each non-compressed packet which is determined to be an important packet into a refresh-header packet, the refresh-header packet including a refresh header, the refresh header including enough information to recover synchronization in a receiver node; and a transmitter that transmits a packet stream containing the refresh header packet and the header-compressed packet to the receiver node, a header-compressed packet including a compressed header, the compressed header including less information than the refresh header.

* * * * *

UNITED STATES PATENT AND TRADEMARK OFFICE
CERTIFICATE OF CORRECTION

PATENT NO. : 7,061,936 B2
APPLICATION NO. : 09/794481
DATED : June 13, 2006
INVENTOR(S) : Takeshi Yoshimura et al.

It is certified that error appears in the above-identified patent and that said Letters Patent is hereby corrected as shown below:

<u>On the Title Page, Item (56)</u>

Under "FOREIGN PATENT DOCUMENTS", delete "P2003-519956" and substitute --P2003-519965-- in its place.

Signed and Sealed this

Fourteenth Day of November, 2006

JON W. DUDAS
*Director of the United States Patent and Trademark Office*